United States Patent
Baba

(10) Patent No.: US 11,429,050 B2
(45) Date of Patent: Aug. 30, 2022

(54) PRINTING APPARATUS, CONTROL METHOD THEREOF AND STORAGE MEDIUM

(71) Applicant: CANON KABUSHIKI KAISHA, Tokyo (JP)

(72) Inventor: Naoko Baba, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/929,399

(22) Filed: Jul. 15, 2020

(65) Prior Publication Data

US 2021/0026283 A1 Jan. 28, 2021

(30) Foreign Application Priority Data

Jul. 24, 2019 (JP) .............................. JP2019-135977

(51) Int. Cl.
*G03G 15/00* (2006.01)

(52) U.S. Cl.
CPC .................................. *G03G 15/553* (2013.01)

(58) Field of Classification Search
None
See application file for complete search history.

(56) References Cited

U.S. PATENT DOCUMENTS

| | | | |
|---|---|---|---|
| 6,488,353 B1 * | 12/2002 | Itoyama | B41J 2/04586 347/19 |
| 6,612,680 B1 * | 9/2003 | King | B41J 29/393 347/19 |
| 7,281,780 B2 | 10/2007 | Nagamura et al. | |
| 7,347,519 B2 | 3/2008 | Nagamura et al. | |
| 7,517,044 B2 | 4/2009 | Suzuki et al. | |
| 7,775,622 B2 | 8/2010 | Suzuki et al. | |
| 7,789,476 B2 | 9/2010 | Tomida et al. | |
| 7,864,984 B2 * | 1/2011 | Miyamoto | B41J 29/393 358/1.9 |
| 7,891,754 B2 | 2/2011 | Nagamura et al. | |
| 7,980,652 B2 | 7/2011 | Baba et al. | |
| 8,057,009 B2 | 11/2011 | Tomida et al. | |
| 8,139,966 B2 | 3/2012 | Murakami | |
| 8,240,795 B2 | 8/2012 | Baba | |
| 8,608,277 B2 | 12/2013 | Tomida et al. | |
| 8,733,874 B2 | 5/2014 | Baba | |
| 9,211,748 B2 | 12/2015 | Baba et al. | |

(Continued)

FOREIGN PATENT DOCUMENTS

| | | |
|---|---|---|
| JP | 2004-167947 A | 6/2004 |
| JP | 2008-091966 A | 4/2008 |

*Primary Examiner* — Jas A Sanghera
(74) *Attorney, Agent, or Firm* — Venable LLP

(57) ABSTRACT

An object of one embodiment of the present disclosure is to accurately suppress a color shift. One embodiment of the present disclosure is a printing apparatus including: a print head having a nozzle column including a plurality of nozzles through which ink is ejected; an acquiring unit configured to acquire a measurement value by reading a tone patch pattern printed by the print head; and a setting unit configured to set a printing characteristic based on the measurement value and a target value, and the printing apparatus further includes a determination unit configured to determine whether or not reading has been performed normally based on a variation amount calculated by using the measurement value.

17 Claims, 19 Drawing Sheets

(56) References Cited

U.S. PATENT DOCUMENTS

| | | |
|---|---|---|
| 9,889,649 B2 | 2/2018 | Baba et al. |
| 2008/0118257 A1 | 5/2008 | Murakami |
| 2010/0315461 A1* | 12/2010 | Mongeon ............... B41J 29/393 |
| | | 347/19 |
| 2013/0194327 A1 | 8/2013 | Hara et al. |
| 2015/0077461 A1* | 3/2015 | Shi ......................... B41J 29/393 |
| | | 347/19 |

* cited by examiner

| FIG.12A |
| FIG.12B |

PRINTING APPARATUS, CONTROL METHOD THEREOF AND STORAGE MEDIUM

BACKGROUND OF THE DISCLOSURE

Field of the Disclosure

The present disclosure relates to a technique to suppress a color shift.

Description of the Related Art

Conventionally, as one of output apparatuses that perform printing of an image on various printing media, such as paper, there is an ink jet printing apparatus. There exists an ink jet printing apparatus having a plurality of print heads for the same color ink or an ink jet printing apparatus having a plurality of nozzle columns including a plurality of ejection ports (hereinafter, also referred to as nozzles) for the same color ink.

In the printing apparatus having a plurality of print heads or a plurality of nozzle columns such as this, there is a case where it is not possible to obtain a desired color tone in a printed image resulting from a difference in the ejection characteristic between each of the plurality of print head or each of the plurality of nozzle columns, or the difference in the ejection characteristic such as this occurring afterward. The reason is that the density value of a printed image changes due to the difference in the ejection characteristic.

Factors for the difference in the ejection characteristic for each print head or each nozzle column include a variation in the heat generation amount of a heat-generation heater that causes ink to be ejected (or film thickness of the heat-generation heater), a variation in the diameter of the nozzle through which ink is ejected, and the like. Also by a variation in the heat generation amount of the heat-generation heater due to a change over the years and a variation in viscosity of ink due to a difference in the use environment, there is a case where a difference in the ink ejection amount occurs and a change in the printing characteristic formed on a printing medium occurs.

As a technique to deal with the difference in the color tone such as this resulting from the difference in the ejection characteristic for each nozzle column or each print head, color shift correction processing is known. The color shift correction processing is performed by, for example, changing a γ table used for γ correction processing performed as one of the series of image processing for correcting the ejection characteristic of the print head. Specifically, patches are printed on a printing medium by using a plurality of print heads or a plurality of nozzle columns and based on the patch printing results, the γ table used for the γ correction processing is set again to an appropriate table.

As the method of detecting a color shift in the printed patch, there is a method of detecting the printed patch by using an input device, such as a scanner. A method is known (for example, Japanese Patent Laid-Open No. 2004-167947) in which a patch is printed for each color material of C, M, Y, and K, each of the printed patches is read by a scanner, a colorimeter, or a densitometer attached to the printing apparatus, a deviation between the read value and an expectation value of the patch is detected, and then tint correction including changing the value of the γ value or the like based on the deviation is performed.

Further, in a case where it is not possible to accurately acquire the read value because of some factor, erroneous correction is performed, and therefore, a method is known, which suppresses inappropriate density correction based on the read value that is not normal (for example, Japanese Patent Laid-Open No. 2008-91966).

SUMMARY OF THE DISCLOSURE

However, in Japanese Patent Laid-Open No. 2008-91966, based on whether or not the read value is within a predetermined range, whether or not reading has been performed normally is determined, and therefore, even in a case where the read value is within the predetermined range, this does not necessarily mean that the measurement has been performed correctly depending on factors.

For example, due to the occurrence of floating of paper during reading, there is a case where the rise of the density value, which is the read value in a low-tone portion, is lowered and there is such a problem that it is not possible detect erroneous measurement on a condition that the read value falls within a predetermined range in the case such as this.

Consequently, in view of the above-described problem, an object of one embodiment of the present disclosure is to accurately suppress a color shift.

One embodiment of the present disclosure is a printing apparatus including: a print head having a nozzle column including a plurality of nozzles through which ink is ejected; an acquiring unit configured to acquire a measurement value by reading a tone patch pattern printed by the print head; and a setting unit configured to set a printing characteristic based the measurement value and a target value, and the printing apparatus further includes a determination unit configured to determine whether or not reading has been performed normally based on a variation amount calculated by using the measurement value.

Further features of the present disclosure will become apparent from the following description of exemplary embodiments with reference to the attached drawings.

DESCRIPTION OF THE EMBODIMENTS

First Embodiment

<About Configuration of Printing System>

Figure 1:
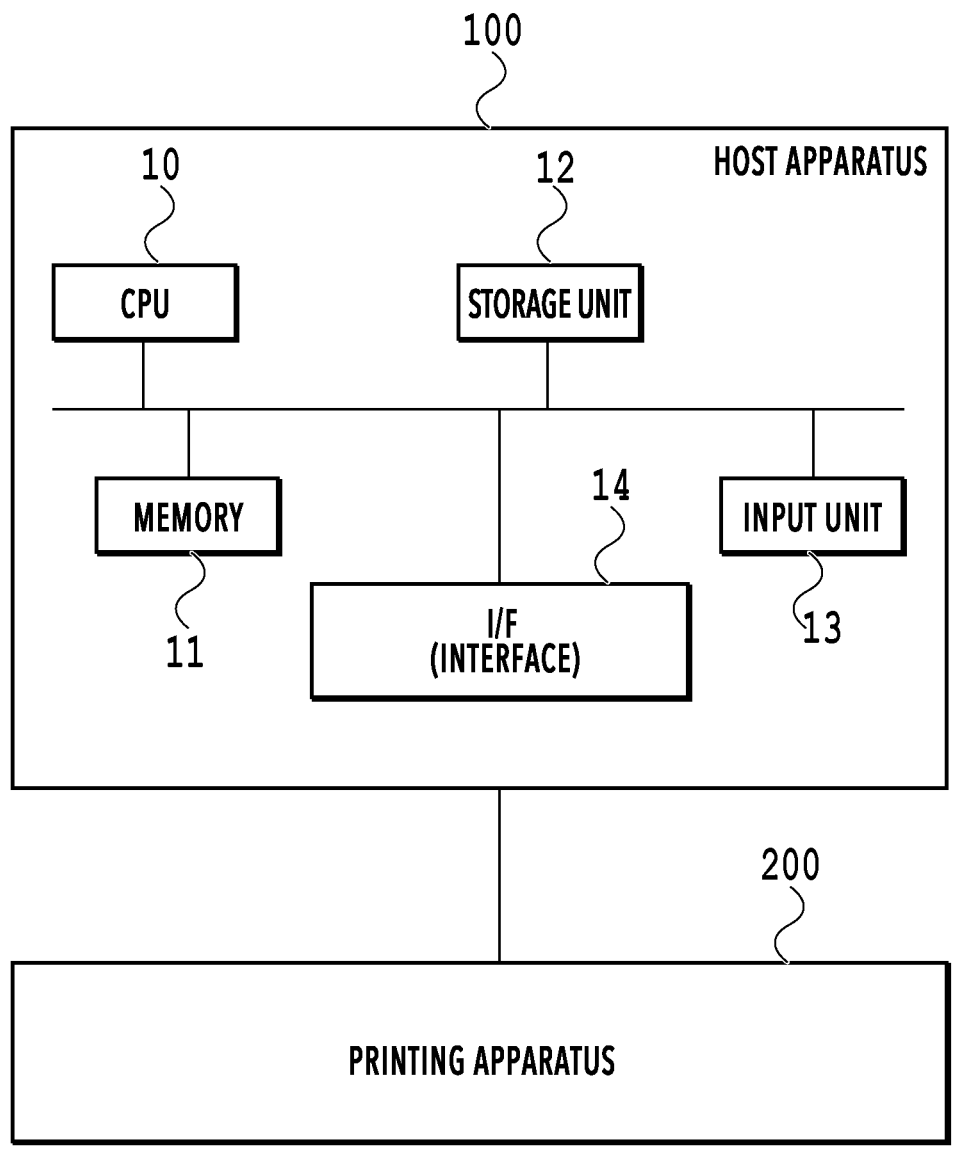
FIG. 1 a block diagram showing an entire configuration of a printing system in a first embodiment.

In the following, with reference to the drawings, preferred embodiments are explained in detail. FIG. 1 is a block diagram showing the entire configuration of a printing system in the present embodiment. The printing system has a host apparatus 100 and a printing apparatus 200. The host apparatus 100 is an information processing apparatus, such as a personal computer and a digital camera, which is connected to the printing apparatus 200. The host apparatus 100 has a CPU 10, a memory 11, a storage unit 12, an input unit 13, such as a keyboard and a mouse, and an interface (hereinafter, I/F) 14 for communication between the host apparatus 100 and the printing apparatus 200. The CPU 10 performs various kinds of processing in accordance with programs loaded onto the memory 11. Those programs are supplied from a storage medium, such as CD-ROM, and stored in advance in the storage unit 12.

The host apparatus 100 is connected with the printing apparatus 200 via the I/F 14. It is possible for the host apparatus 100 and the printing apparatus 200 to transmit data to and receive data from each other. For example, the host apparatus 100 transmits print data represented by pixel values of three channels (specifically, red (hereinafter R), green (hereinafter G), blue (hereinafter B)) in an image processing process, to be described later, and a table for subsequent image processing to the printing apparatus 200. The printing apparatus 200 performs, based on information and data transmitted from the host apparatus 100, in particular, color processing, to be described later, image processing, such as binarization processing, and correction processing of the printing characteristic according to the present embodiment. Further, it is possible for the printing apparatus 200 to perform printing processing based on the print data acquired by image processing.

<About Configuration of Printing Apparatus>

Figure 2:
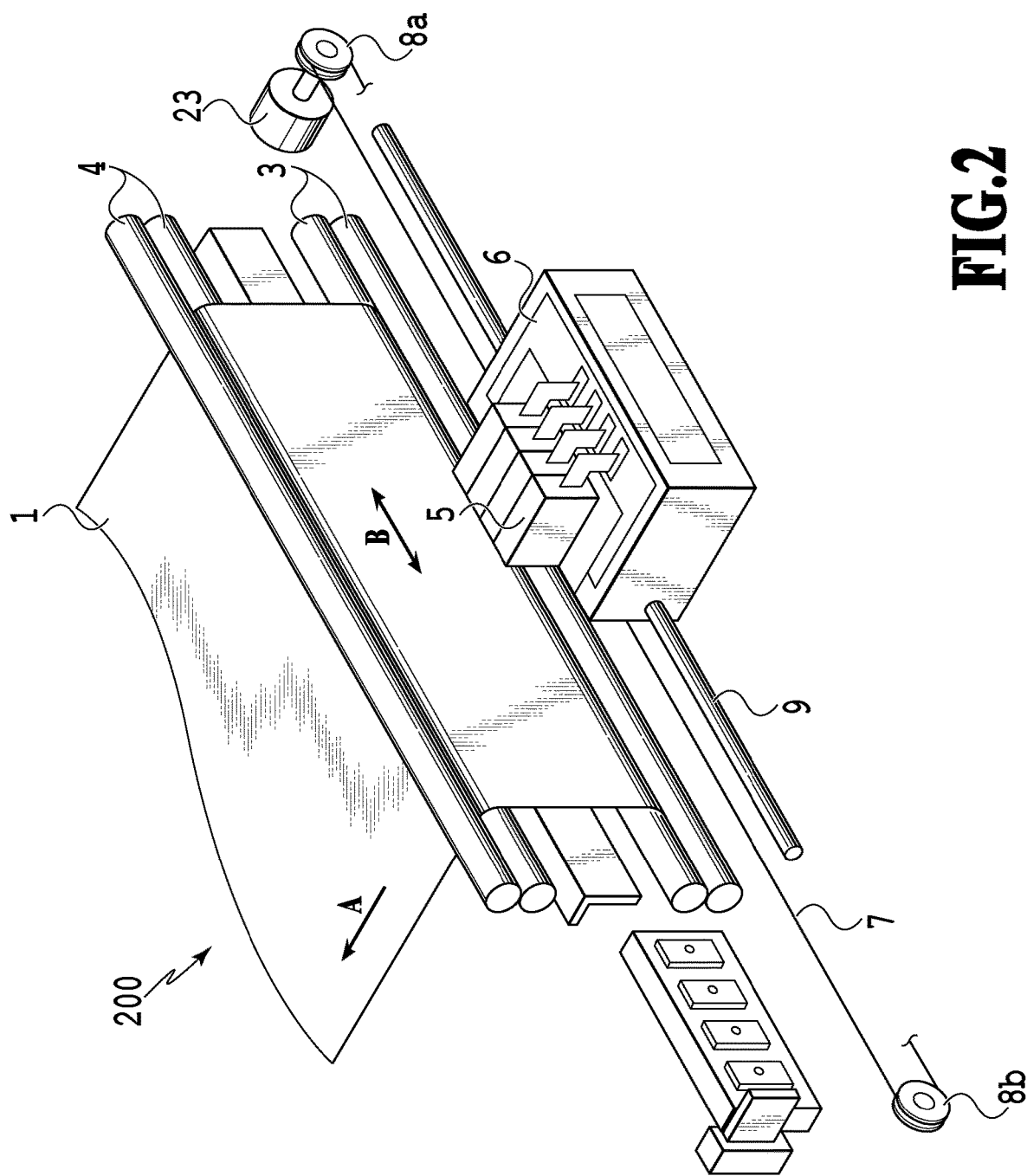
FIG. 2 is a perspective diagram of a printing apparatus in the first embodiment.

FIG. 2 is a schematic perspective diagram showing the mechanical configuration of the printing apparatus 200. As regards a printing medium 1, such as a printing sheet and a plastic sheet, a plurality of the printing media 1 is stacked in a cassette or the like, not shown schematically, and the printing media 1 are separated and supplied one by one by a sheet feed roller, not shown schematically, at the time of printing. The supplied printing medium 1 is conveyed by a predetermined distance each time in an arrow A direction (hereinafter, also referred to as conveyance direction, sub scanning direction) at timing in accordance with the scan of a print head 5 by a first conveyance roller 3 and a second conveyance roller 4 arranged with a predetermined interval in between. The first conveyance roller 3 includes a pair of a drive roller that is driven by a stepping motor (not shown schematically) and a follower roller that rotates accompanying the rotation of the drive roller. Similarly, the second conveyance roller 4 also includes a pair of rollers. It is also possible for the printing apparatus 200 to perform printing on a printing medium in the form of a roll, in addition to the printing medium cut into a predetermined size and stacked in a cassette.

The print head 5 mounted on a carriage 6 is an ink jet print head that performs printing by ejecting ink in each color of cyan (hereinafter C), magenta (hereinafter M), yellow (hereinafter Y), and black (hereinafter K). In the print head 5, nozzle columns through which ink is ejected are arranged side by side in the main scanning direction (see FIG. 3). The print head 5 is supplied with ink from an ink cartridge, not shown schematically. Then, the print head 5 ejects each color ink from each nozzle forming the nozzle column by being driven in accordance with an ejection signal. To explain in detail, within each nozzle through which ink is ejected, an electro-thermal converting element (heater) is provided and by making use of thermal energy generated by the electro-thermal converting element being driven in accordance with the ejection signal, bubbles are generated in ink and the ink is ejected by the pressure of the bubbles.

To the carriage 6, a driving force of a carriage driving motor 23 is transmitted via a belt 7 and pulleys 8a and 8b. Due to this, the carriage 6 reciprocates in an arrow B direction (hereinafter, also referred to as main scanning direction) along the extension direction of a guide shaft 9 and is capable of performing a scan of the print head 5. Further, on the side surface of the carriage 6, a multi-purpose sensor, to be described later, is mounted. The multi-purpose sensor is made use of for detection of the density of ink ejected onto the printing medium, detection of the width of the printing medium, and detection of the distance from the print head to the printing medium.

In the above configuration, it is possible for the print head 5 to perform printing (hereinafter, also referred to as printing scan) by forming a dot of ink on the printing medium 1 by ejecting ink through the nozzle in accordance with the ejection signal while performing the reciprocating scan in the main scanning direction. The print head 5 recovers from a defective ejection state, such as clogging of the nozzle, by moving to the home position as needed and performing the recovery operation by an ejection recovery device provided at the destination position of the movement. After the printing scan by the print head 5, the first conveyance roller 3 and the second conveyance roller 4 are driven and the printing medium 1 is conveyed by a predetermined distance in the arrow A direction. By alternately repeating the printing scan of the print head 5 and the conveyance operation of the printing medium 1, it is possible to print an image and the like on the printing medium 1.

Figure 3:
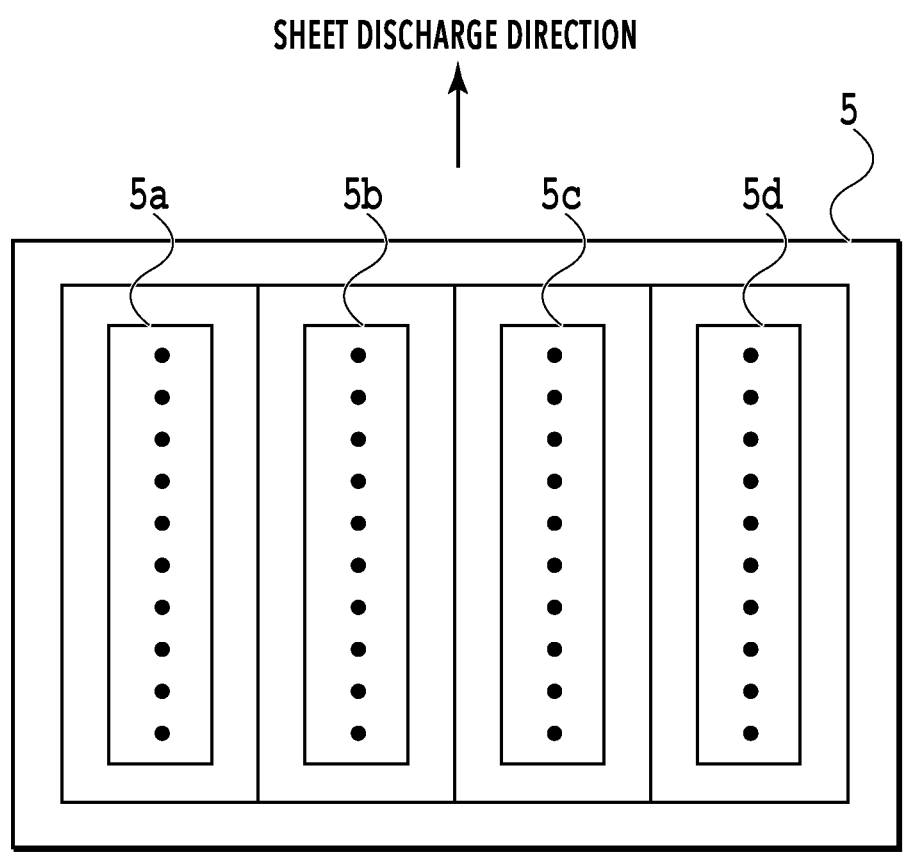
FIG. 3 is a front diagram of a print head in the first embodiment.

FIG. 3 is a front diagram in which the print head 5 having a plurality of nozzle columns through each of which single color ink is ejected is viewed from a surface on which nozzles are arranged (referred to as printing surface). In the example shown in FIG. 3, in the print head 5, four nozzle columns 5a to 5d are arranged along the main scanning direction. Each nozzle column is formed by ten nozzles and to the nozzle column 5a, C ink is supplied, to the nozzle column 5b, M ink is supplied, to the nozzle 5c, Y ink is supplied, and to the nozzle column 5d, K ink is supplied. The number of nozzles and the number of nozzle columns are not limited only to those described here and it may be possible to adopt any numbers. Further, the kinds of ink color are not limited only to those described here.

Figure 4:
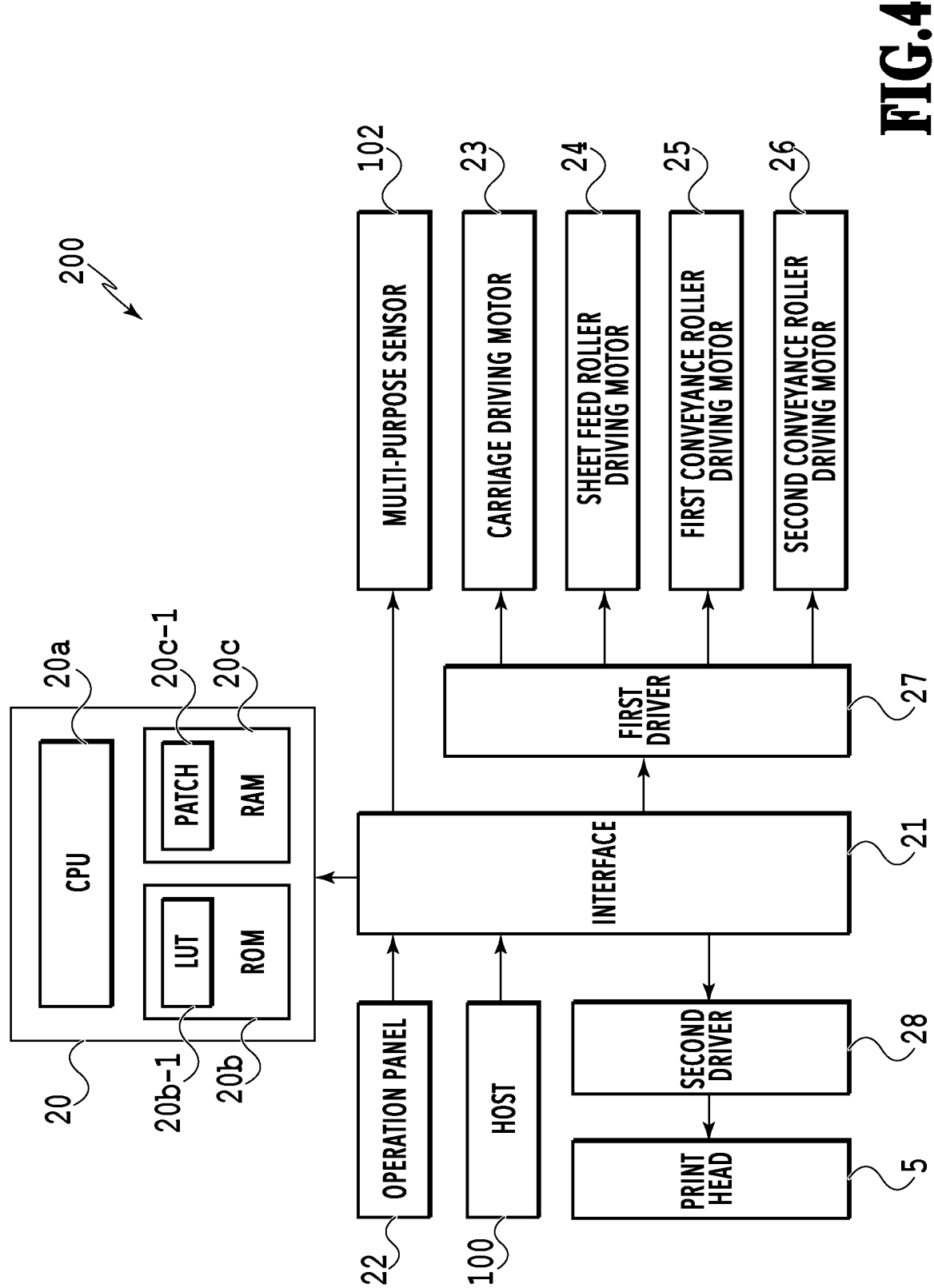
FIG. 4 is a block diagram showing a configuration relating to control of the printing apparatus in the first embodiment.

FIG. 4 is a block diagram showing the configuration of the control system of the printing apparatus 200. A control unit 20 has a CPU 20a, such as a microprocessor, a ROM 20b, and a RAM 20c. In the ROM 20b, control programs of the CPU 20a and various kinds of data, such as parameters, necessary for the printing operation are stored in advance. The RAM 20c is used as a work area of the CPU 20a and at the same time, in the RAM 20c, image data received from the host apparatus 100 and various kinds of data, such as created print data, are stored temporarily.

Figure 7:
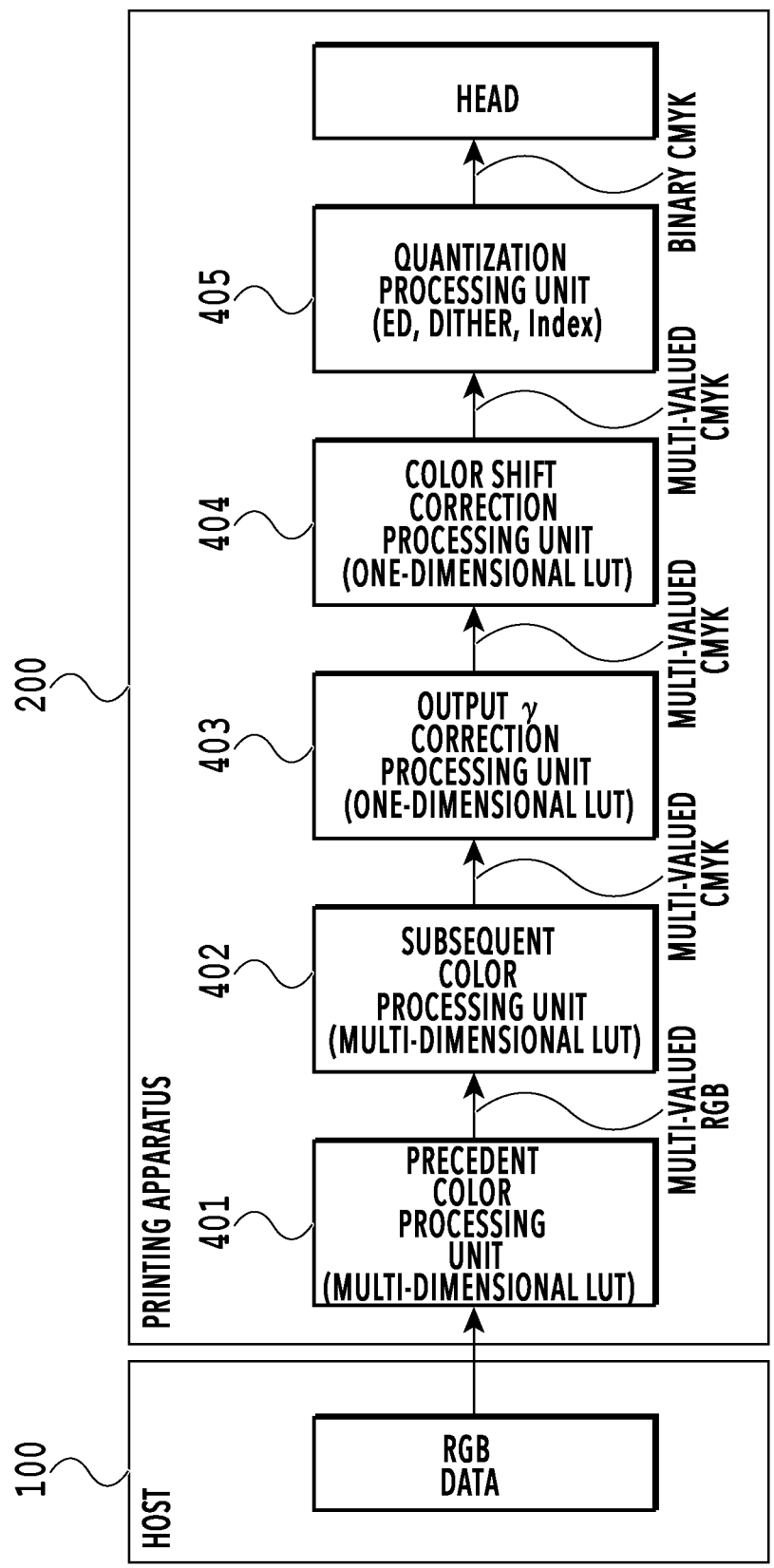
FIG. 7 is a block diagram showing each module that performs image processing in the first embodiment.

Further, in the ROM 20b, a lookup table (hereinafter, LUT) 20b-1, which will be described later by using FIG. 7, is stored in advance. In the RAM 20c, data (referred to as patch pattern data) 20c-1 for printing a patch pattern is stored. The LUT may be stored in the RAM 20c and the patch pattern data may be stored in the ROM 20b.

The control unit 20 performs, via an I/F 21, processing to input and output data and parameters used for printing of image data and the like from and to the host apparatus 100 and processing to receive various kinds of information (for example, character pitch, character kind, and the like) input by a user via an operation panel 22. Further, the control unit 20 outputs ON and OFF signals to drive each of the motor 23 and motors 24 to 26 via the I/F 21. Furthermore, the control unit 20 controls the drive for ink ejection in the print head by outputting an ejection signal and the like to a second driver 28.

Further, the control system of the printing apparatus 200 has the I/F 21, the operation panel 22, a multi-purpose sensor 102, a first driver 27, and the second driver 28. The first driver 27 drives the carriage driving motor 23, the sheet feed roller driving motor 24, the first conveyance roller driving motor 25, and the second conveyance roller driving motor 26 in accordance with instructions from the CPU 20a. The second driver 28 drives the print head 5.

Figure 5A:
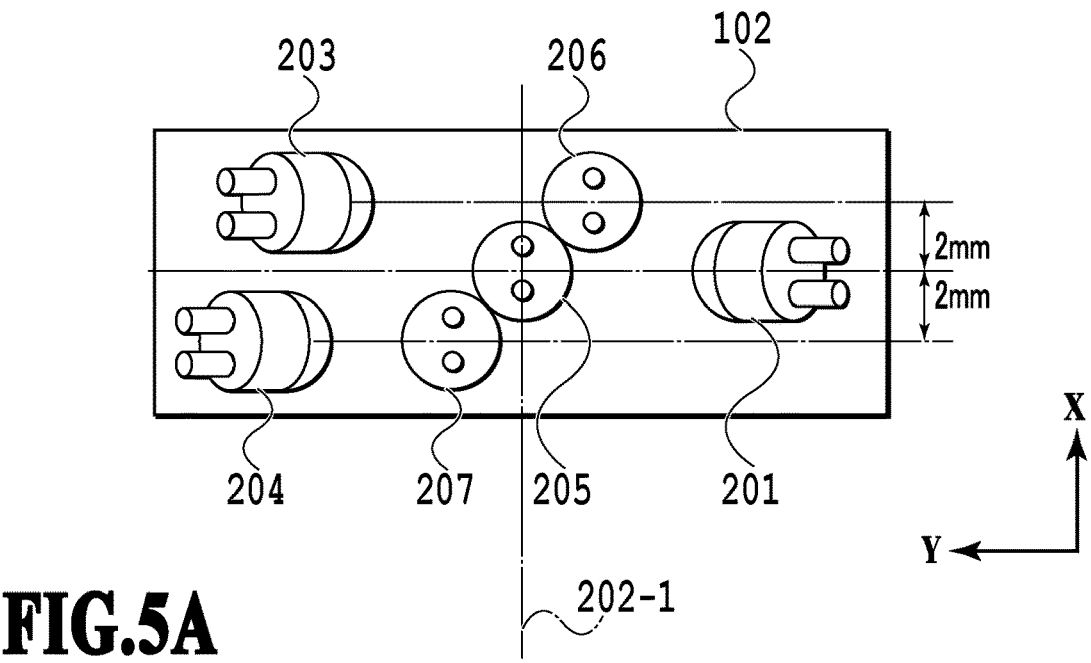
FIG. 5A and FIG. 5B are each a schematic diagram showing a configuration of a multi-purpose sensor in the first embodiment.
Figure 5B:
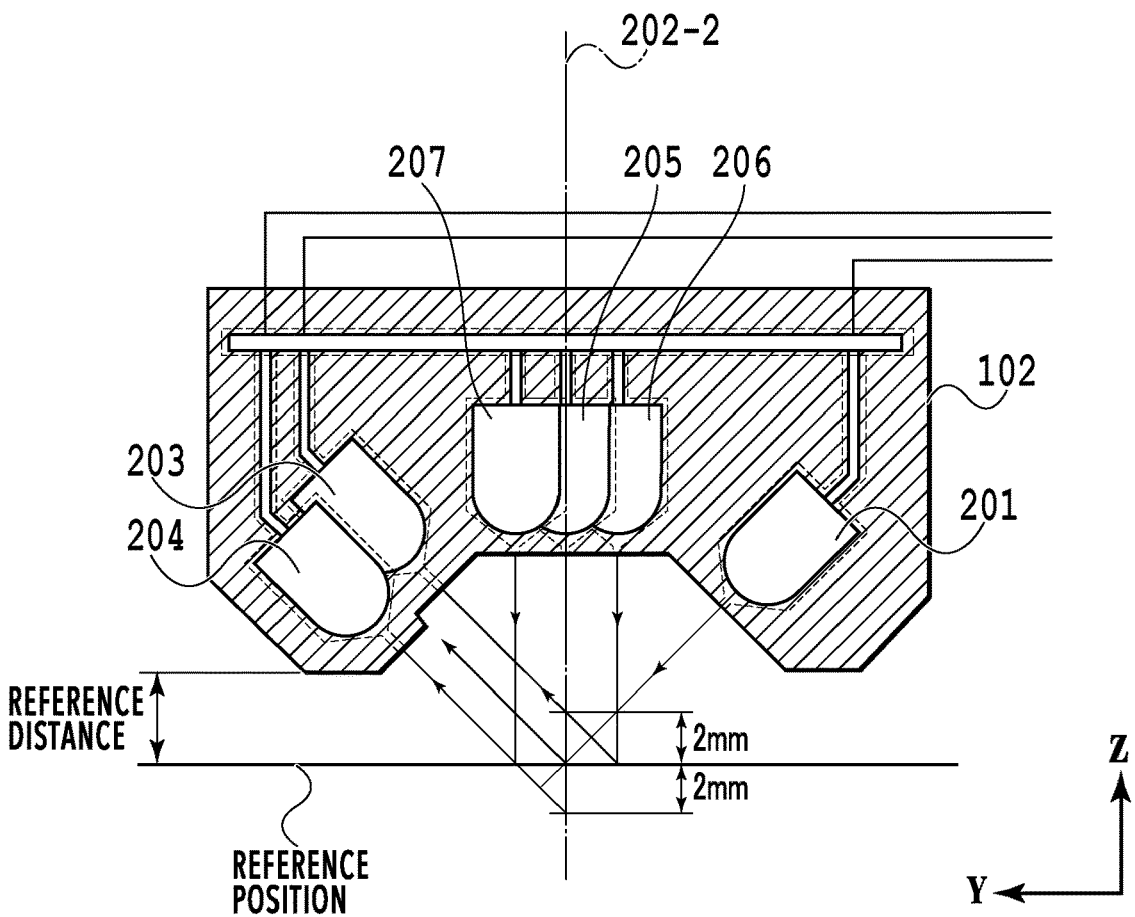

FIG. 5A and FIG. 5B are each a schematic diagram showing the configuration of the multi-purpose sensor 102. FIG. 5A is a plan diagram of the multi-purpose sensor 102 and FIG. 5B is a sectional diagram of the multi-purpose sensor 102. The measurement region of the multi-purpose sensor 102 is located on the downstream side in the conveyance direction with respect to the printing surface of the print head 5. Further, the multi-purpose sensor 102 is arranged so that the lower surface thereof is at the same position as the lower surface of the print head 5 or higher than the lower surface of the print head 5. The multi-purpose sensor 102 comprises, as optical elements, phototransistors 203 and 204, visible LEDs 205, 206, and 207, and an infrared LED 201 and each element is driven by an external circuit, not shown schematically. All these elements are cannonball-type elements whose maximum diameter is about 4 mm (mass production type whose diameter is generally 3.0 to 3.1 mm). In the present embodiment, the line connecting the center point of the irradiated area of the irradiation light irradiated from the light emitting element, with which the measurement surface is irradiated, and the center of the light emitting element is referred to as the optical axis or the radiation axis of the light emitting element. This radiation axis is also the center of the light beam of the irradiation light.

The infrared LED 201 has an angle of irradiation of 45 degrees with respect to the surface (measurement surface) of the printing medium parallel to the XY plane. The infrared LED 201 is arranged so that the radiation axis thereof intersects with a sensor center axis 202 parallel to the normal (Z-axis) of the measurement surface at a predetermined position. The position on the Z-axis of the position of intersection (referred to as intersection point) is taken as a reference position and the distance from the sensor to the reference position is taken as a reference distance. The width of the irradiation light of the infrared LED 201 is adjusted by an opening and optimized so as to form a light-emitting region whose diameter is about 4 to 5 mm on the measurement surface located at the reference position. The phototransistors 203 and 204 each have a sensitivity to the light whose wavelength corresponds to those of visible light to infrared light. In a case where the measurement surface is located at the reference position, the phototransistors 203 and 204 are each installed so that the light receiving axis is parallel to the reflection axis of the infrared LED 201. Specifically, the phototransistor 203 is arranged at a position to which the light receiving axis of the phototransistor 203 has move +2 mm in the X-direction and +2 mm in the Z-direction with respect to the reflection axis of the infrared LED 201. Further, the phototransistor 204 is arranged at a position to which the light receiving axis of the phototransistor 204 has moved −2 mm in the X-direction and −2 mm in the Z-direction with respect to the reflection axis of the infrared LED 201.

In a case where the measurement surface is located at the reference position, the intersection point between the measurement surface and the radiation axis of the infrared LED 201 coincides with the intersection point between the measurement surface and the radiation axis of the visual LED 205. Further, the region from which the light to be received by the two phototransistors 203 and 204 respectively is formed on the measurement surface so as to sandwich the coincident intersection points. Between the phototransistor 203 and the phototransistor 204, a spacer about 1 mm thick is sandwiched and the structure is such that the light received by each does not enter the other. Further, on the side of the phototransistors 203 and 204, as on the side of the infrared LED 201, an opening for limiting the light-receiving area is provided and the size thereof is optimized so as to be capable of receiving only the reflected light in the area whose diameter is 3 to 4 mm on the measurement surface located at the reference position. In the present embodiment, the line connecting the center point of the region (area) of the light that the light receiving element can receive and the center of the light receiving element on the measurement-target surface, that is, the so-called the measurement surface, is called the optical axis of the light receiving element, or the light receiving axis. This light receiving axis is also the center of the light beam of the reflected light that is reflected from the measurement surface and received by the light receiving element.

In the example shown in FIG. 5A and FIG. 5B, the visible LED 205 is a single color visible LED having a light-emitting wavelength of green (about 510 to 530 nm) and arranged so that the radiation axis of the visible LED 205 and a sensor center axis 202-2 coincide with each other. The visible LED 206 is a single color visible LED having a light-emitting wavelength of blue (about 460 to 480 nm) and arranged at a position to which the visible LED 206 has moved +2 mm in the X-direction and −2 mm in the Y-direction with respect to the visible LED 205 as shown in FIG. 5A. Further, the visible LED 206 is arranged so that, in a case where the measurement surface is located at the reference position, the radiation axis and the light receiving axis of the phototransistor 203 intersect at the intersection point position between the radiation axis of the visible LED 206 and the measurement surface. The visible LED 207 is a single color visible LED having a light-emitting wavelength of red (about 620 to 640 nm) and arranged at a position to which the visible LED 207 has moved −2 mm in the X-direction and +2 mm in the Y-direction with respect to the visible LED 205 as shown in FIG. 5A. Further, the visible LED 207 is arranged so that, in a case where the measurement surface is located at the reference position, the radiation axis and the light receiving axis of the phototransistor 204 intersects at the intersection point position between the radiation axis of the visible LED 207 and the measurement surface.

Figure 6:
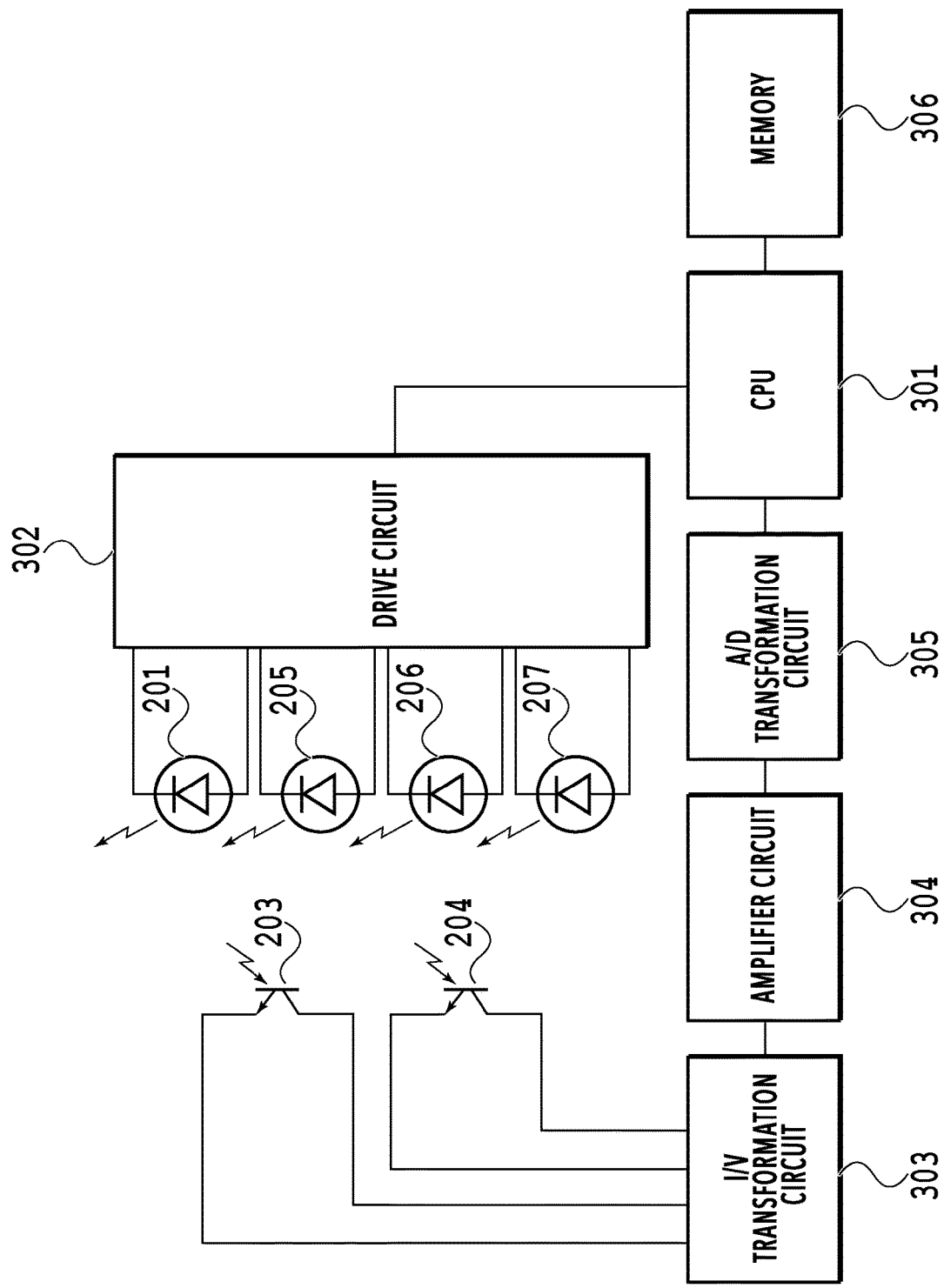
FIG. 6 is schematic diagram of a control circuit that processes input/output signals of each sensor in the multi-purpose sensor in the first embodiment.

FIG. 6 is the schematic diagram of the control circuit that processes the input/output signals of each sensor of the multi-purpose sensor 102. A CPU 301 outputs the ON/OFF control signals of the infrared LED 201 and the visible LEDs 205 to 207, calculates the output signals obtained in accordance with the amount of received light of the phototransistors 203 and 204, and so on. A drive circuit 302 supplies a predetermined current to each light emitting element upon receipt of the ON signal sent from the CPU 301 to cause the light emitting element to emit light, adjusts the amount of emitted light of each light emitting element so that the amount of received light of the light receiving element becomes a predetermined amount, and so on. An I/V transformation circuit 303 transforms the output signal sent from the phototransistors 203 and 204 as a current value into a voltage value. An amplifier circuit 304 acts to amplify the output signal after being transformed into the voltage value, which is a minute signal, into a level optimum in A/D transformation. An A/D transformation circuit 305 transforms the output signal amplified by the amplifier circuit 304 into a 10-bit digital value and inputs it to the CPU 301. A memory (nonvolatile memory or the like) 306 is used for recording a reference table for deriving a desired measurement value from calculation results of the CPU 301 and for temporarily storing output values. It may also be possible to use the CPU 20a or the RAM 20c of the printing apparatus 200 as the CPU 301 or the memory 306 in FIG. 6 (see FIG. 4).

<About Image Processing>

In the following, the image processing in the present embodiment, specifically, the series of processing for creating the print data used in the printing apparatus 200 in the host apparatus 100 and the printing apparatus 200 is explained by using FIG. 7 and FIG. 8. FIG. 7 is a block diagram showing each module that performs the image processing in the present embodiment.

In the image processing of the present embodiment, in the host apparatus 100, image data (luminance data) in which each color of R, and B is represented by eight bits (256 tones each) is input. After that, processing to output one-bit bit image data (print data) for each nozzle, which is printed by the nozzle columns 5a to 5d finally is performed. The kinds of color and the tones of the color are not limited to the values described here.

First, the host apparatus 100 transmits the image data represented by a multi-valued (eight bits for each color) luminance signal of R, and B to the printing apparatus 200.

Following the above, a precedent color processing unit 401 performs, as preprocessing, processing to convert image data represented by a multi-valued luminance signal of R, and B into multi-valued data on R, and B by using a multi-dimensional LUT. The processing to convert a color space as the preprocessing such as this (hereinafter, referred to as precedent color processing) is performed to correct a difference between the color space of the input image represented by the printing-target image data on R, and B and the color space that the printing apparatus 200 can reproduce.

Next, a subsequent color processing unit 402 converts, as post-processing, the data on each color of R, and B for which the precedent color processing has been performed into multi-valued (ten bits) data on C, M, Y, and K, which is each an ink color, by using a multi-dimension LUT. The color conversion processing as the post-processing such as this (hereinafter, referred to as subsequent color processing) is performed for converting image data on three channels of RGB in the input system, which is represented by a luminance signal, into image data on four channels of CMYK in the output system, which is represented by a density signal.

Next, an output γ correction processing unit 403 performs output γ correction processing using a one-dimensional LUT for each color for the multi-valued data on C, M, Y, and K for which the subsequent color processing has been performed. Normally, the relationship between the number of dots to be printed per unit area of a printing medium and the printing characteristic, such as the reflection density obtained by measuring a printed image, is not a linear relationship. Because of this, the output γ correction processing to correct the multi-valued input tone level of C, M, Y, and K is performed so that the relationship between the input tone level of C, M, Y, and K, each being represented by ten bits, and the density level of the image printed thereby becomes a linear relationship.

As described previously, as the output γ correction one-dimensional LUT, one that is created for the print head exhibiting the standard printing characteristic is used frequently. However, as described previously, the print head or the nozzle has an individual difference in the ejection characteristic. Because of this, only by the output γ correction table for correcting the printing characteristic of the print head or the nozzle, exhibiting the standard ejection characteristic, it is not possible to perform appropriate density correction for all the print heads or the nozzles.

Consequently, in the present embodiment, a color shift correction processing unit 404 performs the color shift correction processing by using the one-dimensional LUT for the multi-valued data on C, M, Y, and K for which the output γ correction processing has been performed. The color shift correction one-dimensional LUT used by the color shift correction processing unit 404 is set based on the density value information on each nozzle column, which is acquired in the color shift correction processing process.

After that, a quantization processing unit 405 performs halftone processing using error diffusion or dither patterns, and quantization processing by Index development, and then, the data is output as the print data for the print head.

Figure 8:
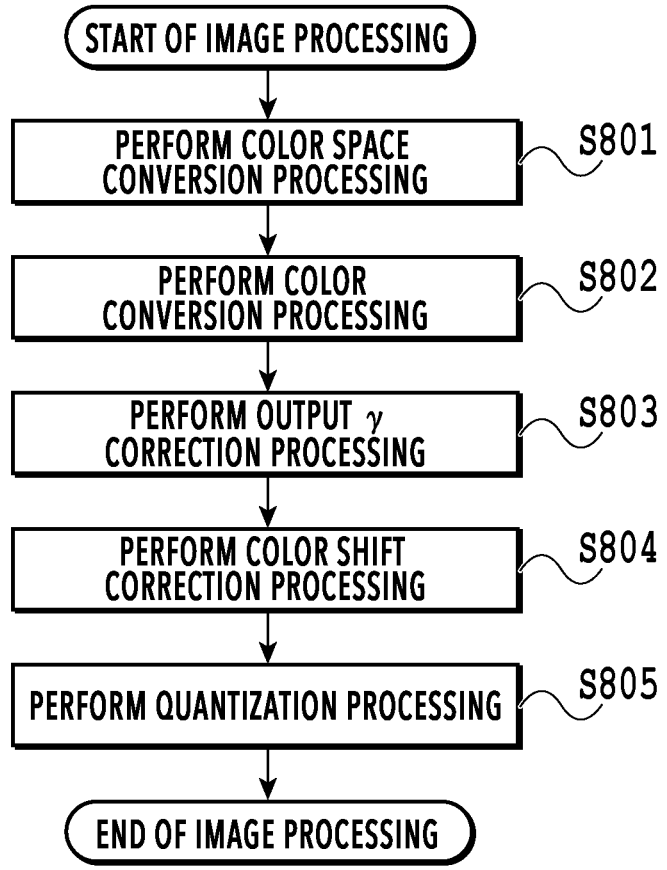
FIG. 8 is a flowchart of image processing in the first embodiment.

FIG. 8 is a flowchart showing the flow of the image processing in the present embodiment. First, at step S801, the precedent color processing unit 401 performs color space conversion processing to convert the image data represented by the multi-valued luminance signal of R, and B received from the host apparatus 100 into multi-valued data on R, and B by using the multi-dimensional LUT. In the following, "step S-" is abbreviated to "S-".

At S802, the subsequent color processing unit 402 converts the multi-valued data on R, and B obtained by the color space conversion processing at S801 into multi-valued data on C, M, Y, and K, each of which is an ink color, by using the multi-dimensional LUT.

At S803, the output γ correction processing unit 403 performs the output γ correction processing using the one-dimensional LUT of each color for the multi-valued data on C, M, Y, and K obtained by the color conversion processing at S802.

At S804, the color shift correction processing unit 404 performs the color shift correction processing by using the color shift correction one-dimensional LUT for the multi-valued data on C, M, Y, and K obtained by the output γ correction processing at S803.

At S805, the quantization processing unit 405 performs the halftone processing using error diffusion and dither patterns, and the quantization processing by Index development for the multi-valued data on each of C, M, Y, and K obtained by the color shift correction processing at S804. By converting the multi-valued data on each of C, M, Y, and K into binary data on each of C, M, Y, and K at this step, the data for printing by the nozzle column is created.

<About Density Characteristic Acquisition Processing>

Figure 9:
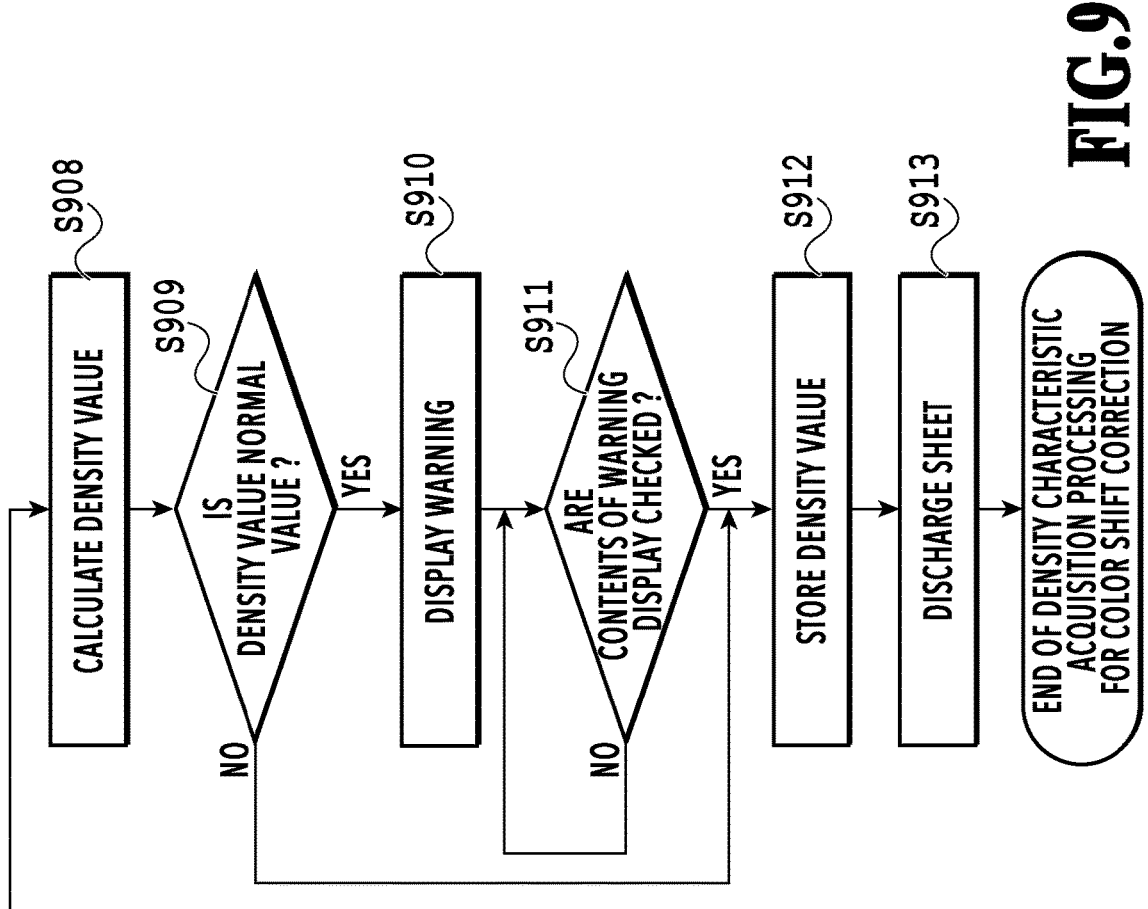
FIG. 9 is a flowchart of density characteristic acquisition processing in the first embodiment.
Figure 9:
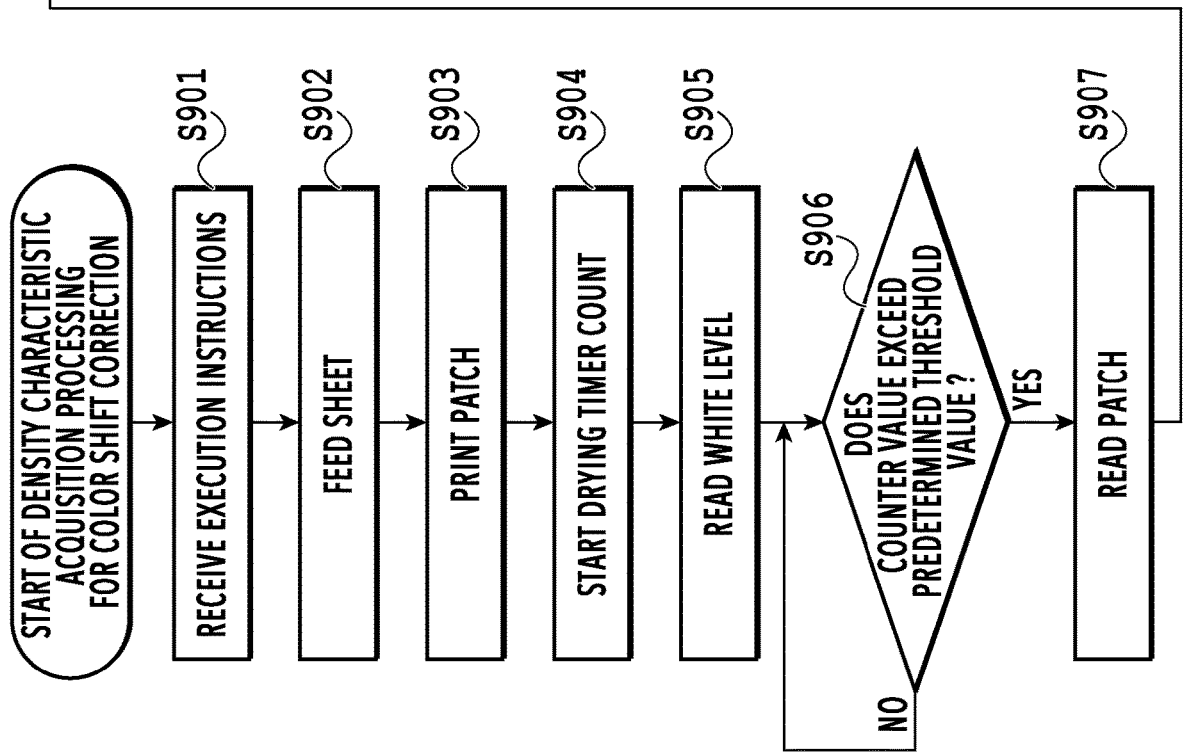

In the following, processing to acquire the density characteristic of the printing apparatus, which is used in the color shift correction processing (S804 in FIG. 8), is explained by using FIG. 9. FIG. 9 is a flowchart of the processing to acquire the density characteristic of the printing apparatus.

At S901, the CPU 20a receives instructions to perform processing to print a patch pattern and measure the density, that is, so-called density characteristic acquisition processing, which are input via the input unit 13 of the host apparatus 100, the operation panel 22 of the printing apparatus 200 or the like.

At S902, the CPU 20a starts supply of a printing medium from the sheet feed tray by driving the sheet feed roller driving motor 24.

In a case where the printing medium 1 is conveyed up to the region in which printing by the print head 5 is possible, at S903, the CPU 20a alternately performs the conveyance operation of the printing medium 1 in the sub scanning direction and the printing scan of the carriage 6 in the main scanning direction by driving the carriage driving motor 23. By this step, the print head 5 as the patch pattern printing unit prints the patch pattern for acquiring the characteristic of each nozzle on the printing medium 1.

At S904, the CPU 20a starts time count by a timer for standing by for a predetermined time. The time count by the timer (referred to as drying timer) that is started at this step is performed for the purpose of securing a predetermined time necessary for drying the patch pattern printed at S903.

At S905, the CPU 20a performs reflection intensity measurement of a white level (ground color of printing medium) on which no patch pattern is printed by using the visible LED 205 having a light-emitting wavelength of green, the visible LED 206 having a light-emitting wavelength of blue, and the visible LED 207 having a light-emitting wavelength of red. The measurement results of the white level obtained at this step are made use of as the value of the reference white at the time of performing density value calculation (S908) after this. Because of this, the white level value for each visible LED is stored. Here, the density of the blank portion of the printing medium on which no patch pattern is printed is obtained by measuring the ground color of the printing medium and in a case of a white printing medium, the ground color is white. In the present embodiment, a case where a printing medium whose ground color is white is explained.

At S906, the CPU 20a determines whether the count value of the drying timer having started count at S904 is greater than a predetermined time threshold value. In a case where determination results at this step are affirmative, the processing advances to S907. On the other hand, in a case where the determination results at this step are negative, the CPU 20a waits until the count value of the drying counter becomes greater than the predetermined time threshold value.

At S907, the CPU 20a performs reflection intensity measurement of the patch pattern. The reflection intensity measurement is performed by turning on the LED suitable to the ink color for which the density is measured among the visible LEDs 205 to 207 mounted on the multi-purpose sensor 102 and reading the reflected light by the phototransistors 203 and 204. At this time, the phototransistors 203 and 204 function as the measurement unit configured to measure the density of the patch pattern.

The visible LED 205 having a light-emitting wavelength of green is turned on in a case where, for example, the patch pattern printed in the M ink and the blank portion (ground color of printing medium) on which no patch pattern is printed are measured. Further, the visible LED 206 having a light-emitting wavelength of blue is turned on in a case where, for example, the patch pattern printed in the Y ink and the K ink and the blank portion (ground color of printing medium) on which no patch patter is printed are measured. Furthermore, the visible LED 207 having a light-emitting wavelength of red is turned on in a case where, for example, the patch pattern printed in the C ink and the blank portion (ground color of printing medium) on which no touch pattern is printed are measured.

In a case where the patch pattern reading at S907 is completed, the processing advances to S908. At S908, the CPU 20a calculates the density value of the patch pattern for each corresponding nozzle based on both the measurement value of the patch pattern, which is acquired at S907, and the white level value acquired at S905. For the ink color for which the visible LED 205 having a light-emitting wavelength of green is used at the time of patch reading, the output value of the white level read by the visible LED 205 is used. For the ink color for which the visible LED 206 having a light-emitting wavelength of blue is used at the time of patch reading, the output value of the white level read by the visible LED 206 is used. For the ink color for which the visible LED 207 having a light-emitting wavelength of red is used at the time of patch reading, the output value of the white level read by the visible LED 207 is used. It is possible to calculate the density value by calculating the logarithm of the reflection intensity of the patch in a case where the reflection intensity of paper white is taken to be 100%. Specifically, for example, it is possible to calculate the density value of the patch printed in the M ink by formula (1) below in a case where the white level read by the visible LED 205 is taken to be Gw and the patch read value to be Gm.

$$\text{Density value } ODm = -\log(Gm/Gw) \quad \text{formula (1)}$$

At S909, the CPU 20a determines whether the density value calculated at S908 is a normal value. In a case where determination results at this step are affirmative, the processing advances to S910 and on the other hand, in a case where the determination results are negative, the processing advances to S912. Details of the determination processing (read value determination processing) at this step will be described later by using FIG. 12A to FIG. 15C.

At S910, the CPU 20a displays a warning via the operation panel 22 or the like.

At S911, the CPU 20a determines whether a user has checked the display contents of the warning displayed at S910, for example, whether a user has pressed down the "OK" button. In a case where determination results at this step are affirmative, the processing advances to S912. On the other hand, in a case where the determination results at this step are negative, the CPU 20a waits until a user checks the display contents of the warning.

At S912, the CPU 20a stores the density value calculated at S908 in the RAM 20c or the memory 306.

At S913, the CPU 20a performs discharge processing of a printing medium and the series of processing is terminated.

In a case where the results of the density value determination at S909 indicate that the density value is not a normal value, it may also be possible to terminate the series of processing by taking this as an error without causing the processing to advance to S910.

<About Patch Pattern>

Figure 10A:
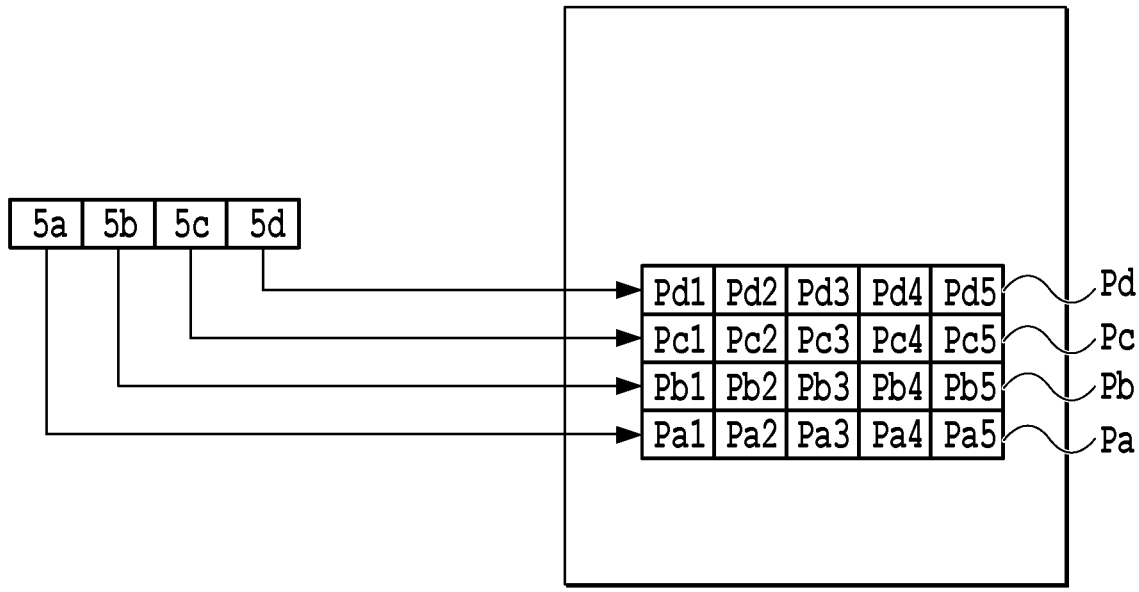
FIG. 10A and FIG. 10B are each a schematic diagram showing patch patterns that are printed and whose density is measured in the first embodiment.
Figure 10B:
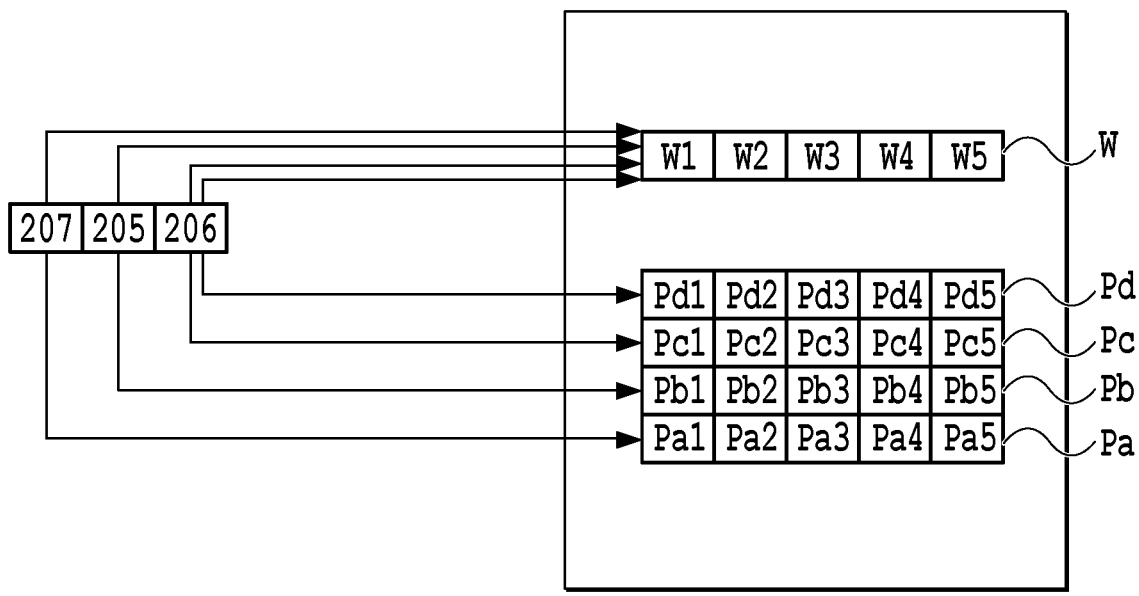

In the following, the patch pattern is explained by using FIG. 10A and FIG. 10B. FIG. 10A and FIG. 10B are each a schematic diagram showing patch patterns printed by the printing apparatus 200 and read by the multi-purpose sensor 102 and positions on the printing medium not printed by the printing apparatus 200 and read by the multi-purpose sensor 102.

FIG. 10A is a diagram showing a relationship between patch patterns printed in ink ejected from the nozzle columns 5a to 5d. Symbol Pa in FIG. 10A indicates the patches printed in ink ejected from the nozzle column 5a. Similarly, symbol Pb in FIG. 10A indicates the patches printed in ink ejected from the nozzle column 5b, symbol Pc indicates the patches printed in ink ejected from the nozzle column 5c, and symbol Pd indicates the patches printed in ink ejected from the nozzle column 5d. Further, the FIGS. 1 to 5 attached to Pa to Pd indicate ranking of the density tone of the patch to be printed. Specifically, for example, Pa1 indicates the patch with which an image whose tone value is rank 1 is printed. Further, for example, Pa1 to Pa5 are patch patterns printed by using the nozzle column 5a and tone patch patterns whose density is changed stepwise. The tone values are not limited to the five values described here. Further, the value of the figure is not necessarily related to the height of the tone.

FIG. 10B is a diagram showing a relationship between the printed patch patterns and the visible LEDs 205 to 207 that read the white level. Symbols W1 to W5 in FIG. 10B each indicate the position for reading the white level and printing is not performed at this position.

The color shift correction one-dimensional LUT is created by using the density value of each patch pattern shown in FIG. 10A and FIG. 10B, which is obtained by the white level reading (S905) and the patch reading (S907) in the density characteristic acquisition processing process shown in FIG. 9. In more detail, the color shift correction one-dimensional LUT is created by comparing the density value such as this and a predetermined target density determined in advance, which is referred to as a target value. The correction value is modified so that the density printed by each nozzle column on the printing medium becomes close to the target value. As the target value, it is also possible to adopt the density value obtained by reading a patch pattern printed in advance by using an ink jet printing apparatus and a print head, both having a high accuracy. As described above, the target value is a value very close to an ideal value.

Figure 11A:
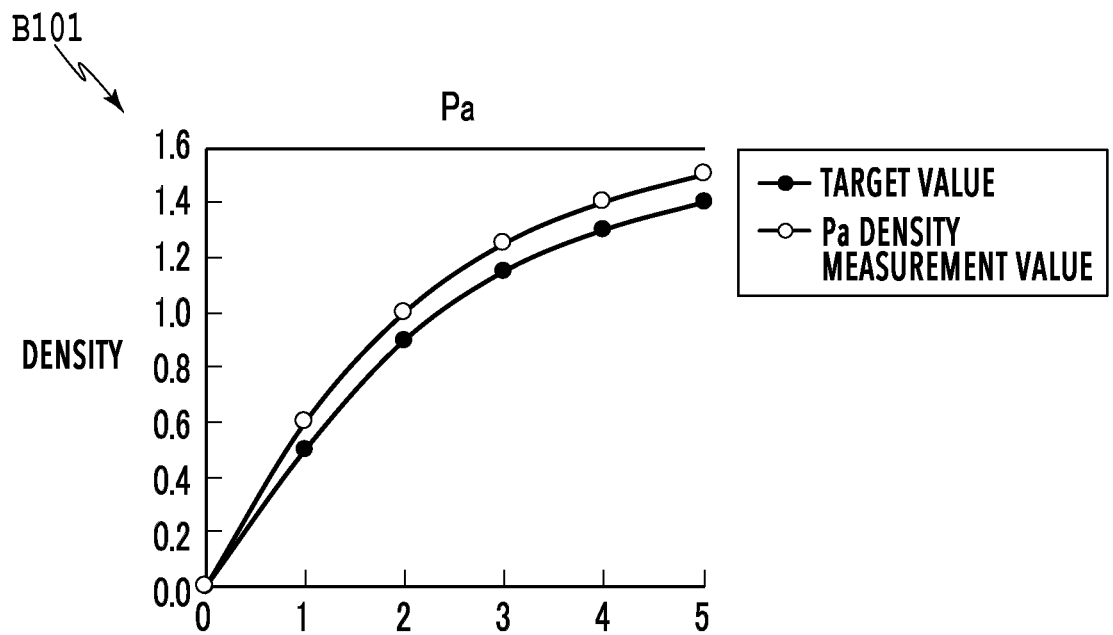
FIG. 11A and FIG. 11B are each a diagram for explaining a creation method of a color shift correction one-dimensional LUT.
Figure 11B:
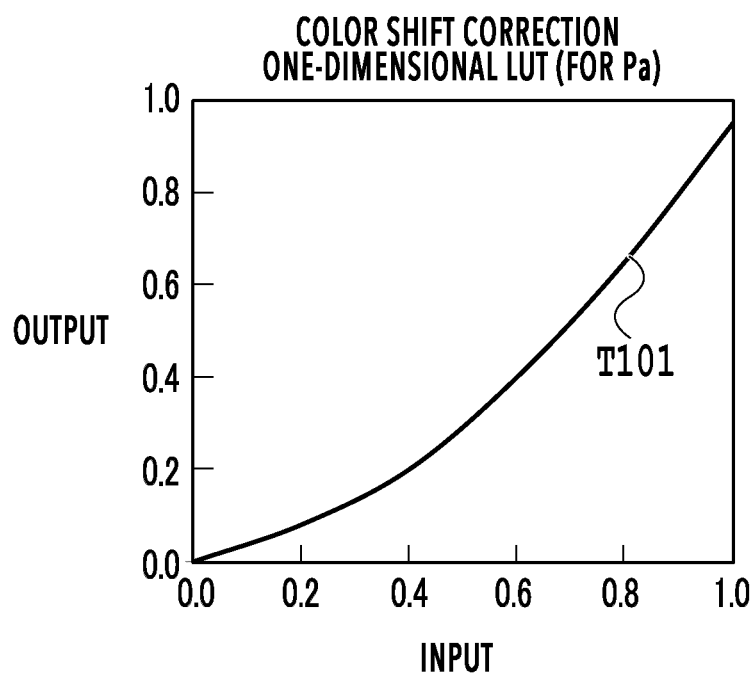

FIG. 11A and FIG. 11B each show an example in which a color shift correction one-dimensional LUT is created. Symbol B101 in FIG. 11A indicates the density values obtained by reading the Pa patch patterns consisting of the patches Pa1 to Pa5 printed by the nozzle column 5a by using the visible LED 207 and the white levels of W1 to W5, and the target values. As the white level value at the time of finding the density value of the patch Pa1, it may also be possible to use the value of W1 or use an average of the five values of W1 to W5.

Symbol T101 in FIG. 11B indicates the color shift correction one-dimensional LUT for the nozzle column 5a, which is created based on the relationship indicated by symbol B101. In the example shown in FIG. 11A, the read density value is greater than the target value. Consequently, a one-dimensional LUT table that converts the image data on the nozzle column 5a so that the output value becomes somewhat small with respect to the input value is created and set.

Similarly, based on the read density values of the Pb patch patterns and the target values, a color shift correction one-dimensional LUT for the nozzle column 5b is created. Based on the read density values of the Pc patch patterns and the target values, a color shift correction one-dimensional LUT for the nozzle column 5c is created. Based on the read density values of the Pd patch patterns and the target values, a color shift correction one-dimensional LUT for the nozzle column 5d is created. It may also be possible to create an individual color shift correction one-dimensional LUT for each kind of printing medium, for each printing resolution, for each use environment, and so on. Further, it may also be possible to create a color shift correction one-dimensional LUT each time in the image processing process at the time of printing an image, or create and save it at the time of performing color shift correction processing. Furthermore, it may also be possible to select and set a color shift one-dimensional LUT from among tables created in advance.

<About Read Value Determination Processing>

Figures 12, 12A:
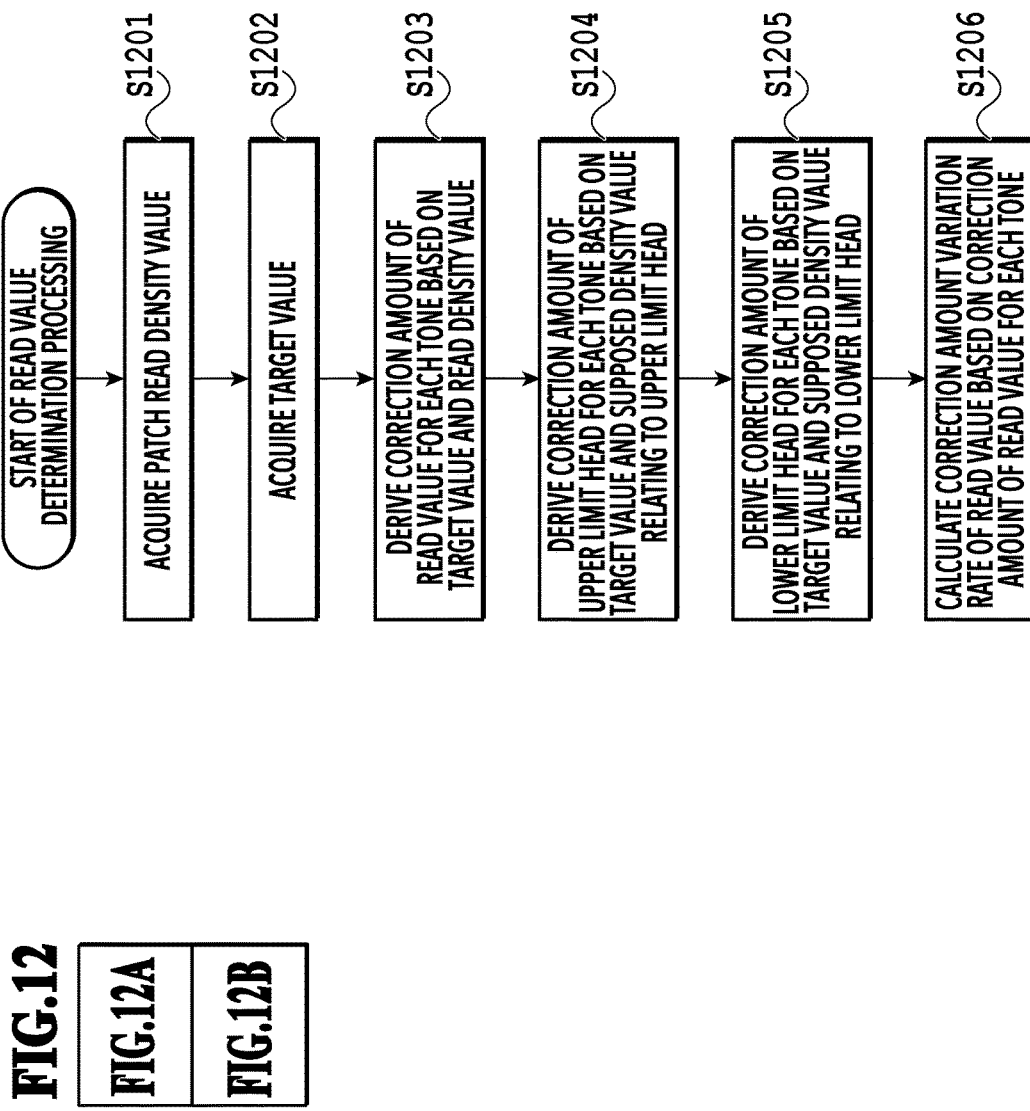
FIG. 12 is a diagram showing the relationship between FIG. 12A and FIG. 12B.
FIG. 12A and FIG. 12B are flowcharts of read value determination processing in the first embodiment.
Figure 12B:
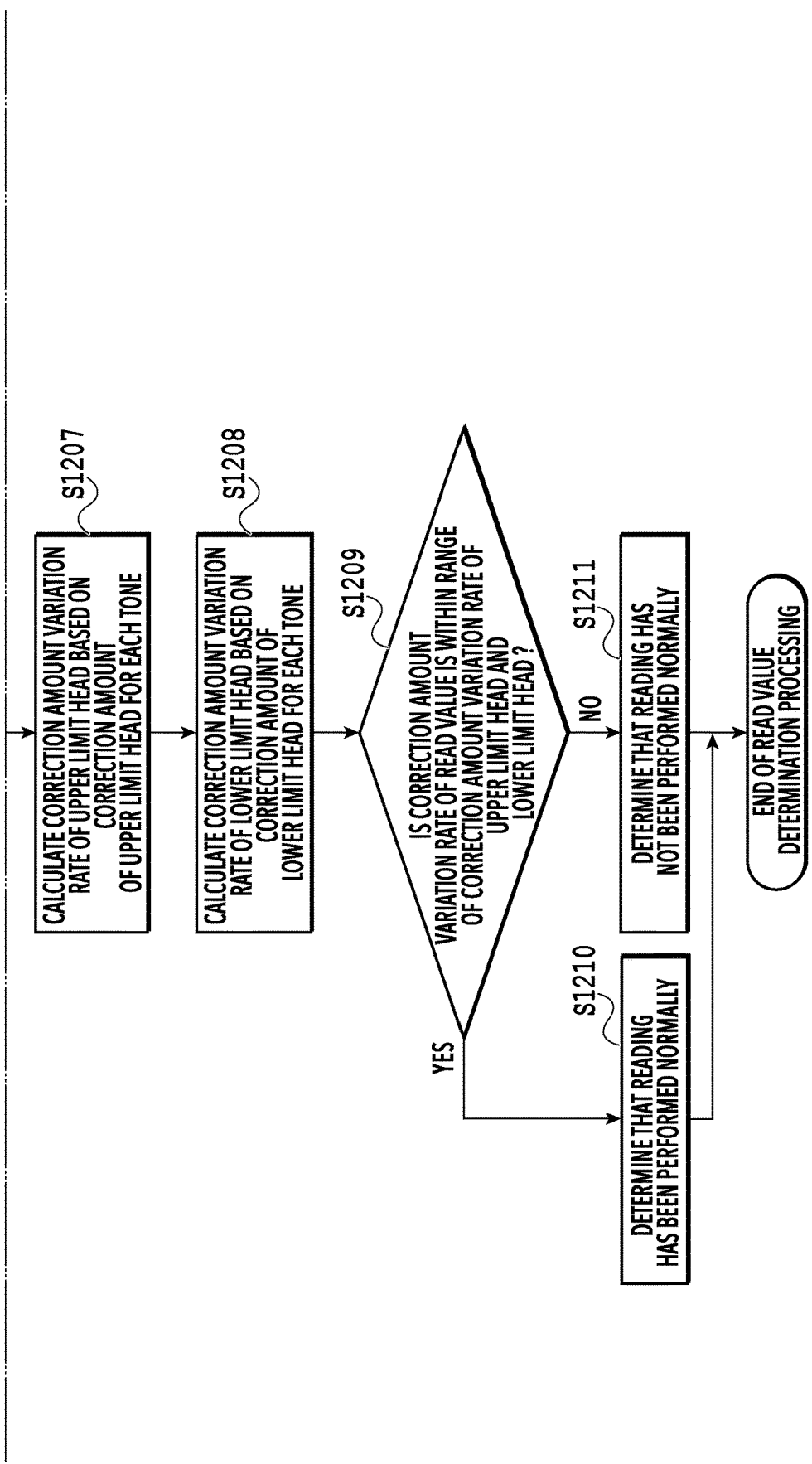

In the following, the read value determination processing (S909 in FIG. 9) in the present embodiment is explained by using FIG. 12A and FIG. 12B to FIG. 15C. FIG. 12A and FIG. 12B are flowcharts of the read value determination processing.

In the read value determination processing, first, at S1201, the CPU 20a acquires the patch read density value for each tone.

At S1202, the CPU 20a acquires the target value for each tone.

At S1203, the CPU 20a derives the correction amount of the read value for each tone based on the patch read density value acquired at S1201 and the target value acquired at S1202.

Figure 13A:
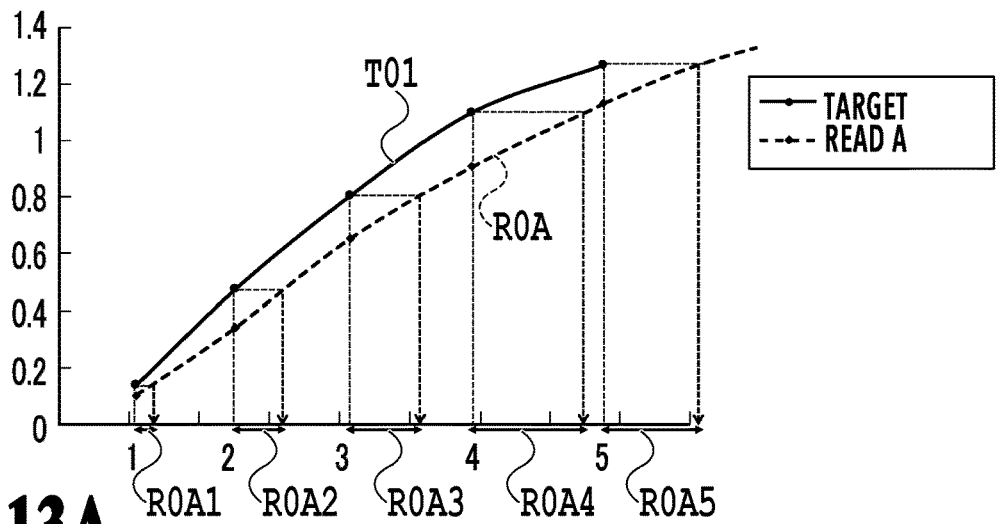
FIG. 13A to FIG. 13C are each a diagram for explaining a correction amount derivation method in the first embodiment.
Figure 13B:
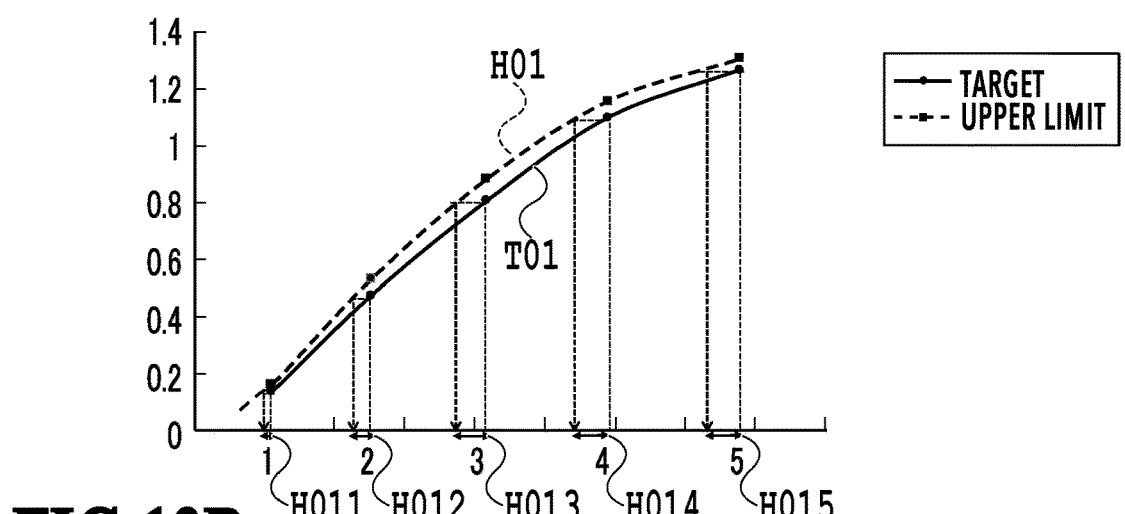
Figure 13C:
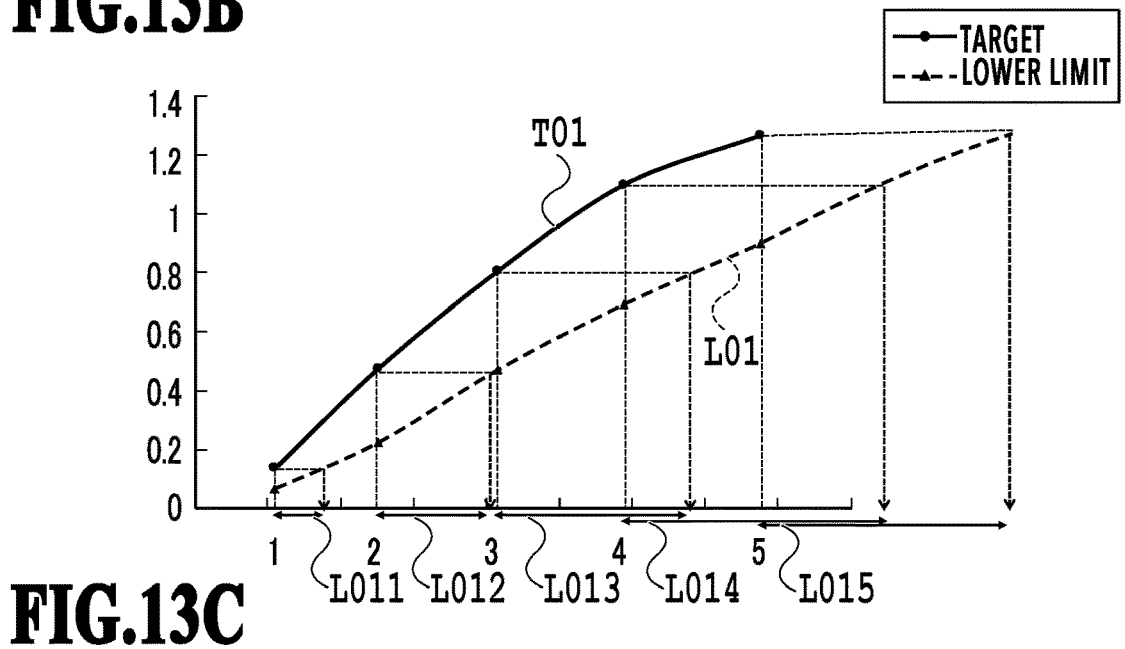

Here, the correction amount derivation is explained by using FIG. 13A to FIG. 13C. A solid line T01 in FIG. 13A is a line connecting a plotted point of the target value at each tone of the C ink. A broken line R0A in FIG. 13A is a line connecting plotted points of the density values obtained by reading the patches Pa1 to Pa5. Symbol R0A1 in FIG. 13A indicates the correction amount for tone 1, symbol R0A2 indicates the correction amount for tone 2, symbol R0A3 indicates the correction amount for tone 3, symbol R0A4 indicates the correction amount for tone 4, and symbol R0A5 indicates the correction amount for tone 5.

At S1204, the CPU 20a derives the correction amount for the print head that ejects ink whose ejection amount is an upper limit value (referred to as upper limit head) for each tone based on the target value and the supposed density value relating to the print head. For example, a broken line H01 in FIG. 13B indicates supposed density upper limit values of tones 1 to 5 as a result of that the ejection amount of the print head varies resulting from the variation in the ejection amount at the time of shipment and the like. Symbol H011 indicates the correction amount for tone 1, symbol H012 indicates the correction amount for tone 2, symbol H013 indicates the correction amount for tone 3, symbol H014 indicates the correction amount for tone 4, and symbol H015 indicates the correction amount for tone 5.

At S1205, the CPU 20a derives the correction amount for the print head that ejects ink whose ejection amount is a lower limit value (referred to as lower limit head) for each tone based on the target value and the supposed density value relating to the print head. For example, a broken line L01 in FIG. 13C indicates supposed density lower limit values of tones 1 to 5 as a result of that the ejection amount of the print head varies resulting from the variation in the ejection amount at the time of shipment and the like. Symbol L011 indicates the correction amount for tone 1, symbol L012 indicates the correction amount for tone 2, symbol L013 indicates the correction amount for tone 3, symbol L014 indicates the correction amount for tone 4, and symbol L015 indicates the correction amount for tone 5.

Figure 14A:
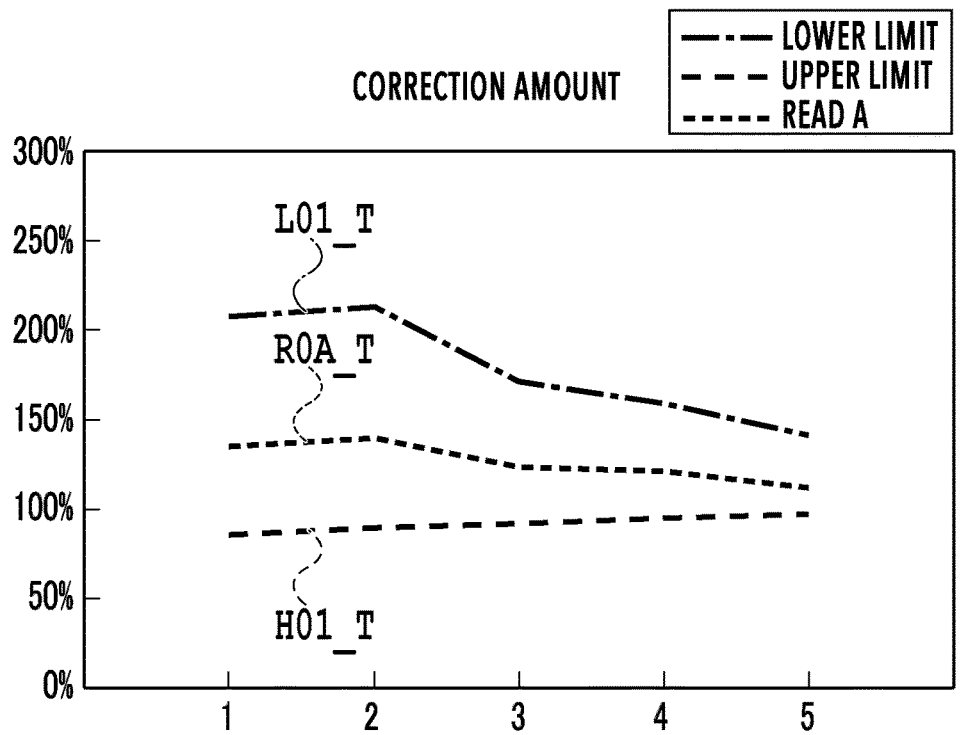
FIG. 14A and FIG. 14B are diagrams for explaining a correction amount of each tone and a correction amount variation rate.
Figure 14B:
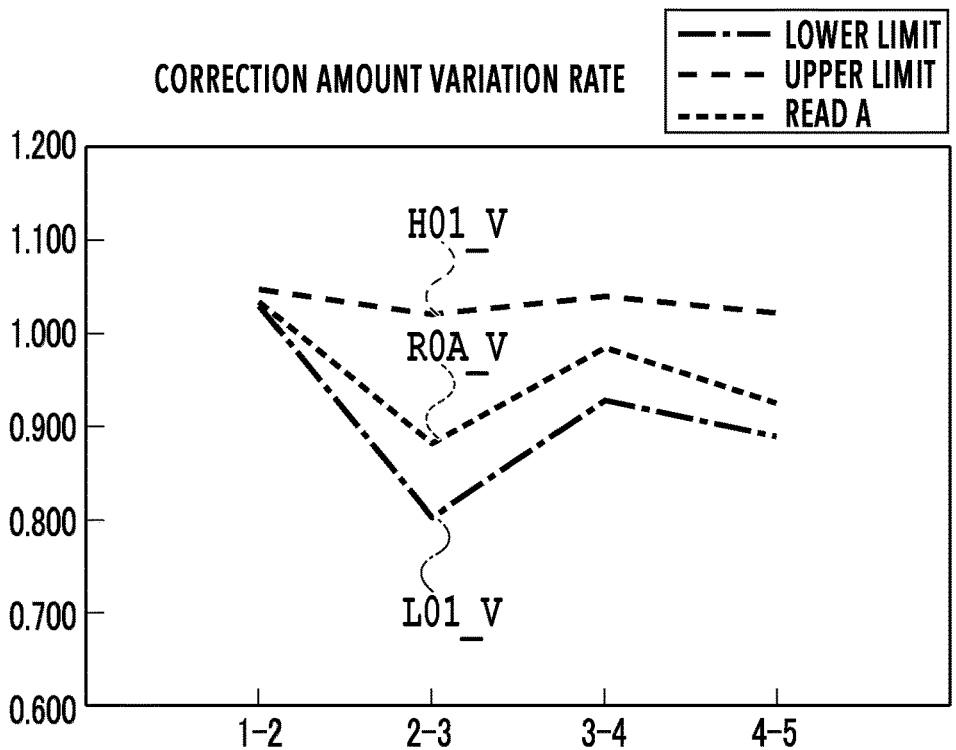

At S1206, the CPU 20a calculates a correction amount variation rate based on the correction amount of the read value for each tone derived at S1203. A broken line R0A_T in FIG. 14A is a line connecting plotted points of the correction amounts R0A1 to R0A5 for each tone and indicates the correction amounts of the read values. A broken line R0A_V in FIG. 14B is a line connecting plotted points of the correction amount variation rates between tones based on the broken line R0A_T.

At S1207, the CPU 20a calculates the correction amount variation rate of the upper limit head based on the correction amount for each tone for the upper limit head derived at S1204. A broken line H01_T in FIG. 14A is a line connecting plotted points of the correction amounts H011 to H015 for each tone and indicates the correction amounts of the upper limit head. A broken line H01_V in FIG. 14B is a line connecting plotted points of the correction amount variation rates between tones based on the broken line H01_T.

At S1208, the CPU 20a calculates the correction amount variation rate of the lower limit head based on the correction amount for each tone for the lower limit head derived at S1205. A broken line L01_T in FIG. 14A is a line connecting plotted points of the correction amounts L011 to L015 for each tone and indicates the correction amounts of the lower limit head. A broken line L01_V in FIG. 14B is a line connecting plotted points of the correction amount variation rates between tones based on the broken line L01_T.

At S1209, the CPU 20a determines whether the correction amount variation rate of the read value is less than or equal to the correction amount variation rate of the upper limit head and more than or equal to the correction amount variation rate of the lower limit head in the entire range. For example, the correction amount variation rate R0A_V of the read value in FIG. 14B is less than or equal to the correction amount variation rate H01_V of the upper limit head and more than or equal to the correction amount variation rate L01_V of the lower limit head in the entire range, and therefore, this condition is satisfied. In a case where determination results at this step are affirmative, the processing advances to S1210 and on the other hand, in a case where the determination results are negative, the processing advance to S1211.

At S1210, the CPU 20a determines that the reading has been performed normally.

At S1211, the CPU 20a determines that the reading has not been performed normally.

Figure 15A:
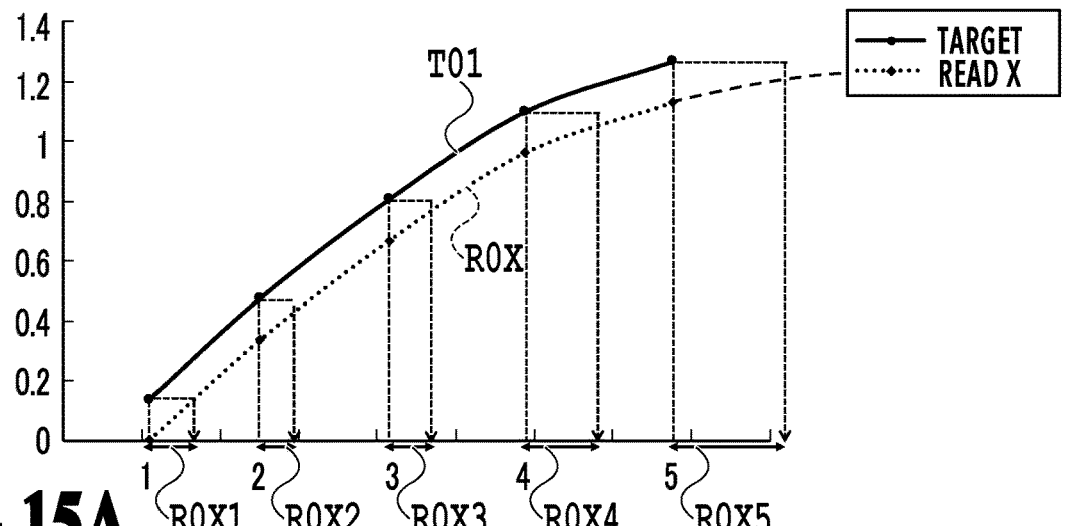
FIG. 15A to FIG. 15C are diagrams for explaining a case where it is determined that reading has not been performed normally.
Figure 15B:
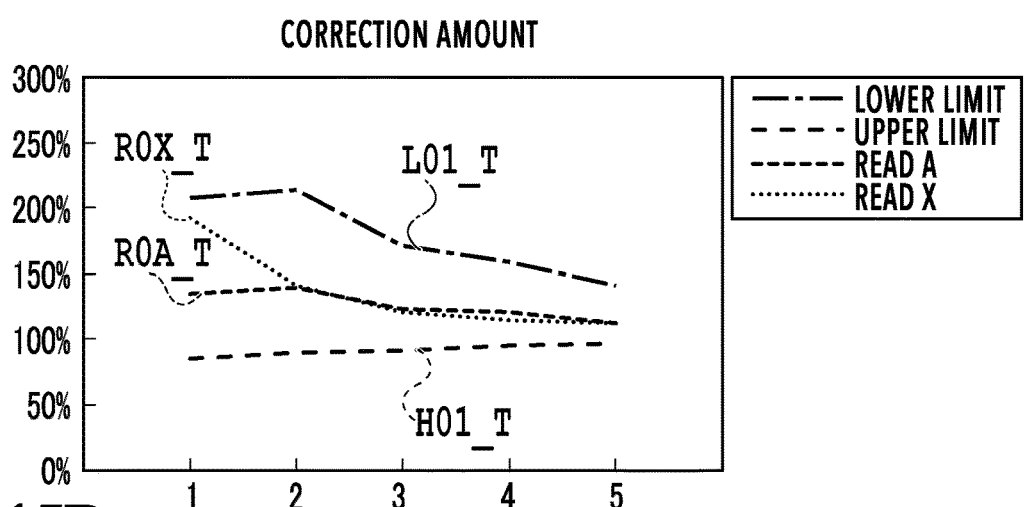
Figure 15C:
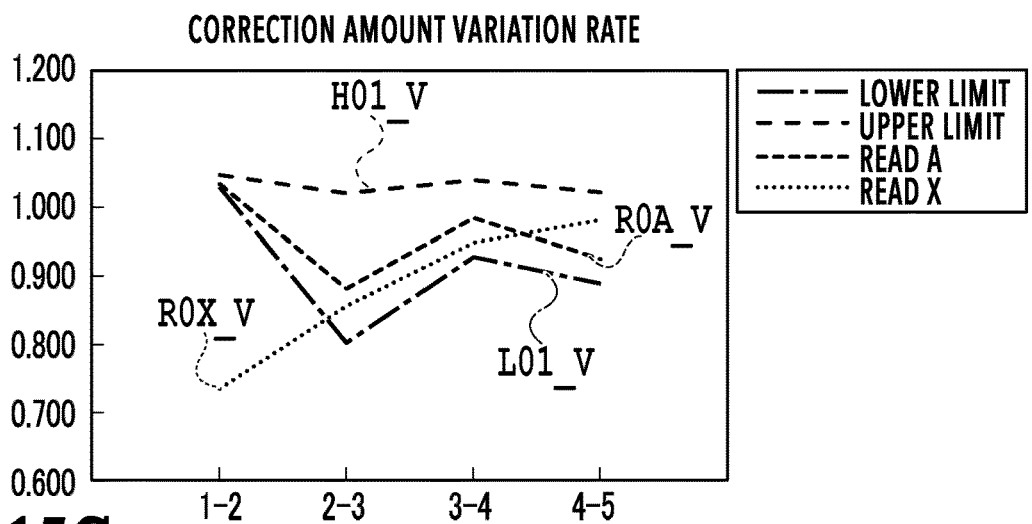

Here, examples of the read density value, the correction amount, and the correction amount variation rate in a case where it is determined that the reading has not been performed normally are shown in FIG. 15A to FIG. 15C. A broken line R0X in FIG. 15A is a line connecting plotted points of the read density values in a case where the reading has not been performed normally and symbols R0X1 to R0X5 indicate the correction amounts in a case where the reading has not been performed normally. A broken line R0X_T in FIG. 15B is a line connecting plotted points of the correction amounts R0X1 to R0X5 for each tone and indicates the correction amounts in a case where the reading has not been performed normally. A broken line R0X_V indicates the correction amount variation rates in a case where the reading has not been performed normally. In the case shown in FIG. 15A to FIG. 15C, the correction amount of the read value is more than or equal to the correction amount of the upper limit head and less than or equal to the correction amount corresponding to the lower limit head in the entire range. However, the correction amount variation rate of the read value is less than the correction amount variation rate L01_V of the lower limit head between tone 1 and tone 2 and the like and not less than or equal to the correction amount variation rate H01_V of the upper limit head or more than or equal to the correction amount variation rate L01_V of the lower limit head in the entire range. Consequently, it is determined that the reading has not been performed normally.

It may also be possible to determine whether or not the reading has been performed normally based on whether or not the change in the correction amount variation rate itself of the read value exhibits a behavior different from the change in the correction amount variation rate itself of the upper limit head and the lower limit head. For example, a case is supposed where although both the correction amount variation rate of the upper limit head and the correction amount variation rate of the lower limit head vary in the upward direction in the section between tone 1 and tone 2, the correction amount variation rate of the read value varies in the downward direction. In the case such as this, even though the correction amount variation rate of the read value is less than or equal to the correction amount variation rate of the upper limit head and less than or equal to the correction amount variation rate of the lower limit head, it is possible to determine that the reading has not been performed normally.

Further, in the aspect described previously, as the read value measured by the multi-purpose sensor and used for determination, the density value is adopted, but it may also be possible to adopt a colorimetric value, a gloss value and the like.

Further, in the aspect described previously, as the index indicating the degree of the correction amount variation (i.e., variation amount), the ratio is adopted, but it may also be possible to adopt a difference.

Further, it may also be possible to set each of the supposed density value relating to the upper limit head and the supposed density value relating to the lower limit head for each ink color or for each printing medium.

Second Embodiment

In the first embodiment, the correction amount of the read value is derived and based on the correction amount variation rate, whether the reading has been performed normally is determined. In the present embodiment, whether the reading has been performed normally is determined without deriving the correction amount. In the present embodiment, a case is supposed where whether the reading has been performed normally is determined resulting from that the paper floating state is different between reading of the white level and reading of the density value of the patch. In the following, differences form the already-described embodiment are explained mainly and explanation of the same configurations as those of the already-described embodiment is omitted appropriately.

Figure 16:
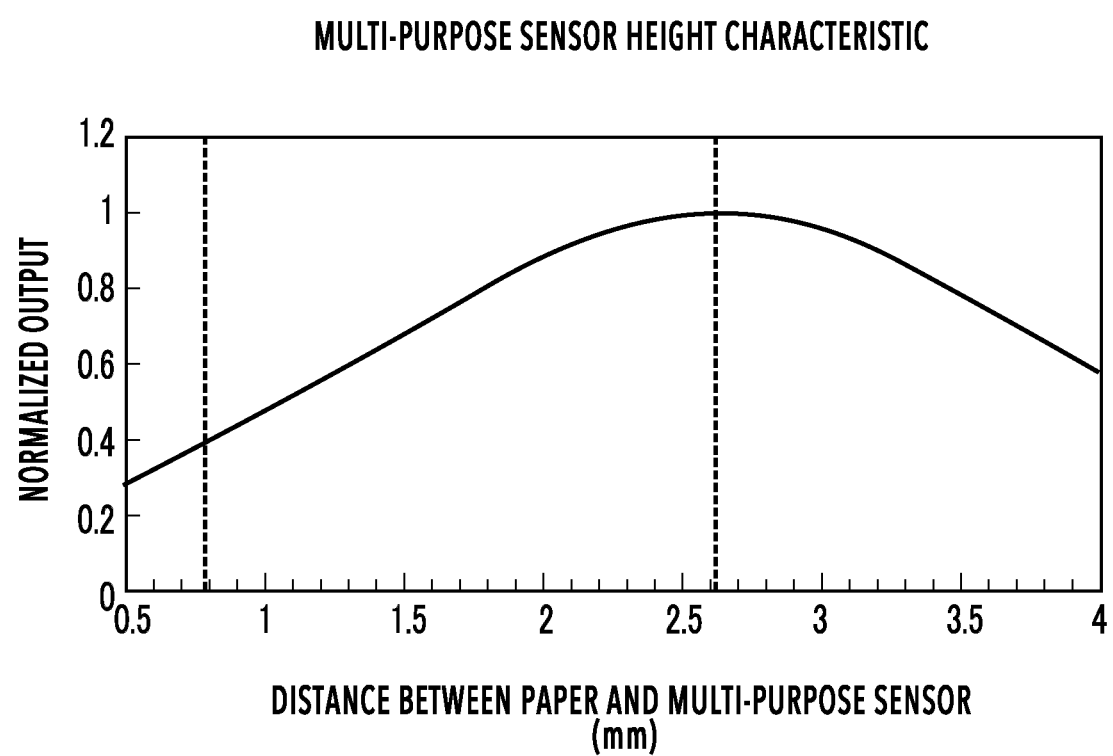
FIG. 16 is a diagram showing the characteristic of the multi-purpose sensor.

FIG. 16 shows results of reading of the multi-purpose sensor 102 and in more detail, shows the variations in the output value in accordance with the distance (hereinafter, also referred to as paper distance) between the multi-purpose sensor and the medium to be read, such as paper. For example, in a case where the output value for a paper distance of 2.6 mm is taken to be 1.0, the output value for a paper distance of 0.8 mm is 0.4. That is, in a case where the position of the printing medium on a condition that the paper distance is 2.6 mm is taken as the normal reading position, the density value in a case where paper floating of 1.8 mm occurs is about 40% of the normal value.

<About Read Value Determination Processing>

Figure 17:
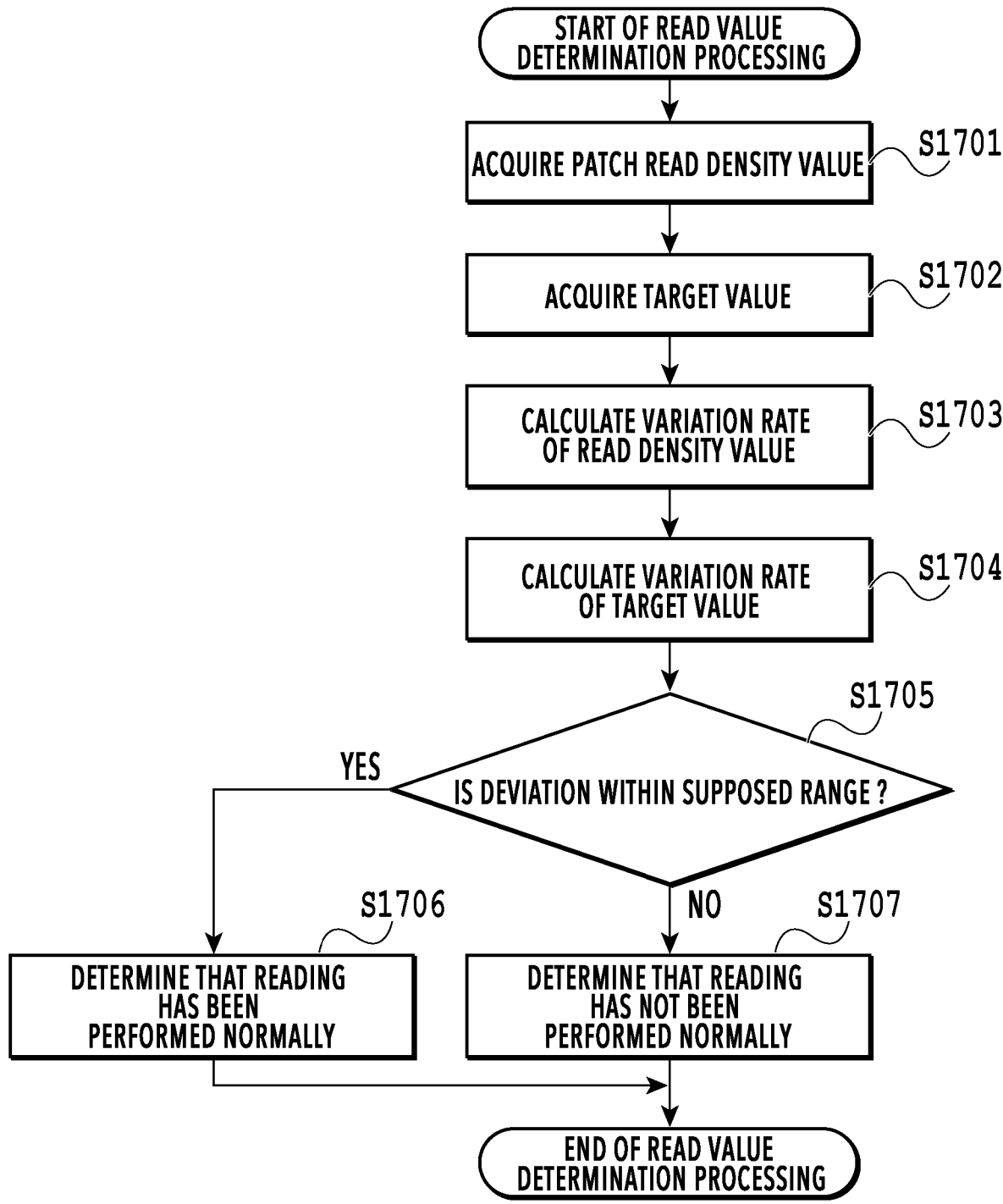
FIG. 17 is a flowchart of read value determination processing in a second embodiment.
Figure 18A:
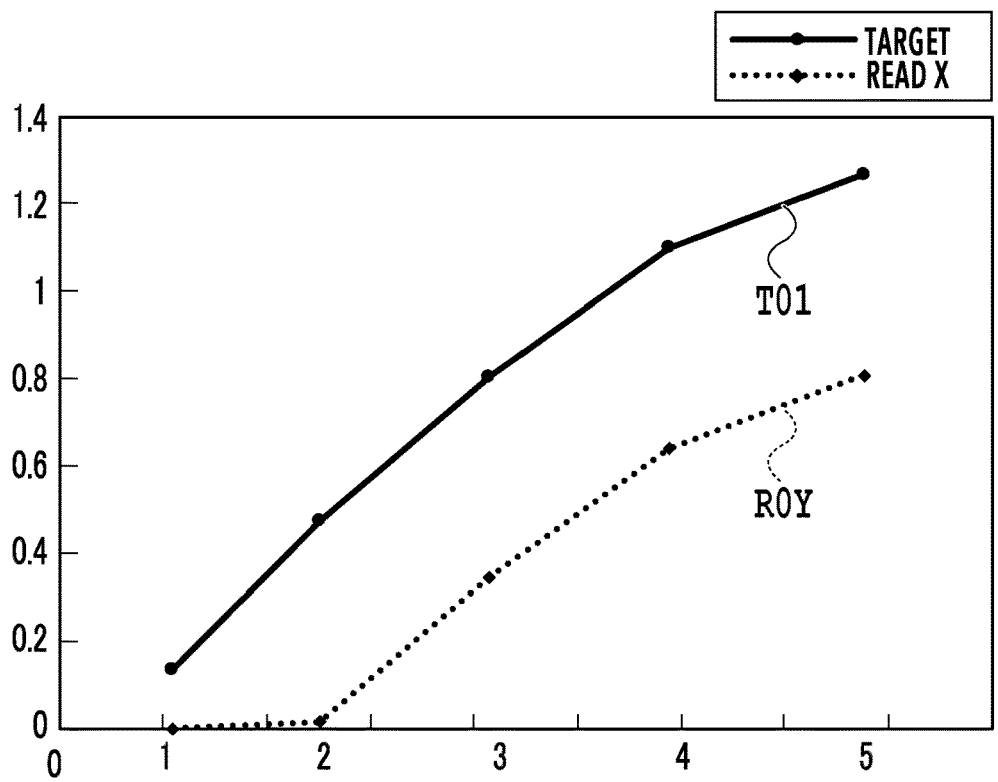
FIG. 18A and FIG. 18B are diagrams for explaining a density value of each tone and a density value variation rate.
Figure 18B:
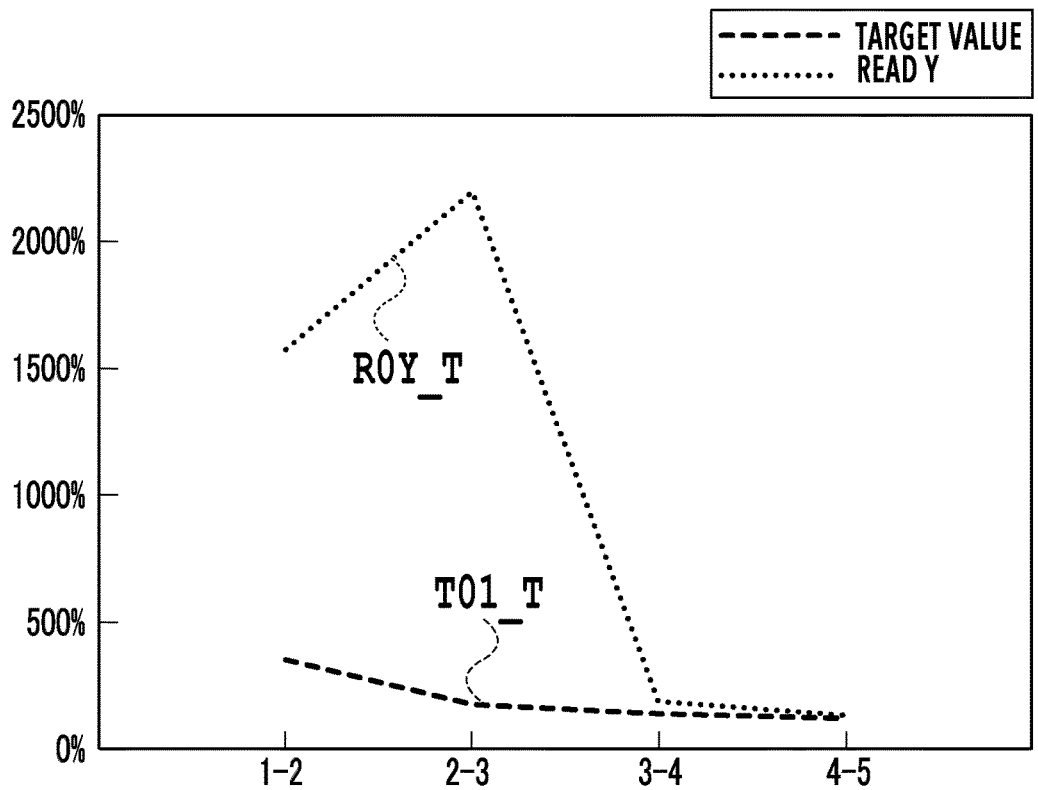

In the following, the read value determination processing (S909 in FIG. 9) in the present embodiment is explained by using FIG. 17, FIG. 18A, and FIG. 18B. FIG. 17 is a flowchart of the read value determination processing.

In the read value determination processing, first, at S1701, the CPU 20a acquires the patch read density value for each tone.

At S1702, the CPU 20a acquires the target value for each tone. For example, a broken line R0Y in FIG. 18A indicates the read density value in a case where the paper floating as described above occurs and in comparison with the target value T01, the graph shape of the density characteristic is largely different.

At S1703, the CPU 20a calculates the variation rate of the read density value based on the read density value for each tone acquired at S1701.

At S1704, the CPU 20a calculates the variation rate of the target value based on the target value for each tone acquired at S1702. FIG. 18B shows a read density value variation rate R0Y_T based on the read density value R0Y and a target value variation rate T01_T based on the target value T01.

At S1705, the CPU 20a determines whether or not the reading has been performed normally by using the read density value variation rate calculated at S1703 and the target value variation rate calculated at S1704. Specifically, the CPU 20a determines whether or not the graph shape of the read density value variation rate deviates shifted from the graph shape of the target value variation rate more than supposed. In a case where the deviation of the graph shape of the read density value variation rate from the graph shape of the target value variation rate is within a supposed range, the processing advances to S1706 and on the other hand, in a case where the deviation exceeds the supposed range, the processing advances to S1707. It may also be possible to determine whether the deviation is within the supposed range by using a magnitude relationship between the deviation amount and a predetermined deviation amount threshold value, or by using the slope of the density value variation rate.

At S1706, the CPU 20a determines that the reading has been performed normally.

At S1707, the CPU 20a determines that the reading has not been performed normally.

As the read value measured by the multi-purpose sensor and used for determination, it may also be possible to adopt a colorimetric value, a gloss value and the like in place of the density value.

Further, in the aspect described previously, as the index indicating the degree of the variation in the density value, the ratio is adopted, but it may also be possible to adopt a difference.

Further, it may also be possible to set the target value for each ink color or for each printing medium.

As described above, according to the present embodiment, it is made possible to maintain the calibration accuracy by avoiding a case where measurement has not been performed correctly or the density of a printed image from becoming inappropriate due a correction mistake by determining an operation mistake of a user.

Other Embodiments

It is possible to apply the technique described in the present specification to all apparatuses that use paper, cloth, leather, non-woven fabric, OHP sheet, and the like, and further a printing medium made of metal. The apparatus to which the technique can be applied includes, for example, a printer, a copy machine, an office device, such as a facsimile, an industrial production device, and the like.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present disclosure, it is possible to accurately suppress a color shift.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-135977, filed Jul. 24, 2019, which is hereby incorporated by reference herein in its entirety.

What is claimed is:

1. A printing apparatus comprising:
a print head including a nozzle column, the nozzle column including a plurality of nozzles through which ink is ejected;
an acquiring unit configured to acquire measurement values by reading a plurality of tone patch patterns printed by the print head, the tone patch patterns having tones that are different from each other;
a controller configured to control a displaying unit to display a warning based on the measurement values; and
a correcting unit configured to correct multi-valued input tone levels of pixels based on the measurement values in a case where the controller obtains information indicating that a user has checked the warning.

2. The printing apparatus according to claim 1, further comprising a derivation unit configured to derive correction amounts for each tone based on the measurement values and a target value.

3. The printing apparatus according to claim 2, further comprising a calculation unit configured to calculate a correction amount variation rate based on the derived correction amounts.

4. The printing apparatus according to claim 1, wherein the measurement values are one of density values, colorimetric values, or gloss values.

5. The printing apparatus according to claim 1, further comprising a determination unit configured to determine whether or not the reading has been performed correctly based on the measurement values,
wherein the controller controls the displaying unit to display the warning in a case where the determination unit determines that the reading has not been performed correctly.

6. The printing apparatus according to claim 5, wherein the determination unit determines that:
reading has been performed correctly in a case where the measurement values are within a predetermined range; and
reading has not been performed correctly in a case where the measurement values are not within the predetermined range.

7. The printing apparatus according to claim 6, wherein the print head or the plurality of nozzles has a variation in ejection amount, and
wherein within the predetermined range is less than or equal to correction amounts corresponding to a first print head that ejects ink whose supposed ejection amount is an upper limit value and more than or equal to correction amounts corresponding to a second print head that ejects ink whose supposed ejection amount is a lower limit value.

8. The printing apparatus according to claim 7, wherein the determination unit determines that reading has not been performed correctly even in a case where the derived correction amounts are more than or equal to the correction amount corresponding to the first print head and less than or equal to the correction amount corresponding to the second print head.

9. The printing apparatus according to claim 5, wherein the determination unit determines whether or not reading has been performed correctly based on a variation amount of the measurement values and a variation amount of target values.

10. The printing apparatus according to claim 9, wherein the determination unit determines whether or not reading has been performed correctly by using a deviation amount between the variation amount of the measurement values and the variation amount of the target values, or using a slope of the variation amount of the measurement values and a slope of the variation amount of the target values.

11. The printing apparatus according to claim 5, wherein the controller does not control the displaying unit to display the warning in a case where the determination unit determines that the reading has been performed correctly.

12. The printing apparatus according to claim 1, wherein the controller stores the measurement values in a memory in a case where the controller obtains information indicating that a user has checked the warning.

13. The printing apparatus according to claim 12, wherein after displaying the warning, the controller waits until the controller obtains information indicating that a user has checked the warning.

14. The printing apparatus according to claim 1, further comprising a setting unit configured to set correction amounts based on the measurement values and a target value, and
wherein the correction unit corrects the multi-valued input tone level of each pixel using the correction amounts.

15. The printing apparatus according to claim 14, wherein the correction amounts are values for correcting variation of a printing characteristic of the print head or a printing characteristic of the plurality of nozzles.

16. A control method of a printing apparatus, the printing apparatus including a print head including a nozzle column, the nozzle column including a plurality of nozzles through which ink is ejected, the control method comprising:
a step of acquiring measurement values by reading a plurality of tone patch patterns printed by the print head, the tone patch patterns having tones that are different from each other;
a step of controlling a displaying unit to display a warning based on the measurement values; and
a step of correcting multi-valued input tone levels of pixels based on the measurement values in a case where the controller obtains information indicating that a user has checked the warning.

17. A non-transitory computer-readable storage medium storing a program for causing a computer to perform a control method of a printing apparatus, the printing apparatus including a print head including a nozzle column, the nozzle column including a plurality of nozzles through which ink is ejected, the control method comprising:
a step of acquiring measurement values by reading a plurality of tone patch patterns printed by the print head, the tone patch patterns having tones that are different from each other;
a step of controlling a displaying unit to display a warning based on the measurement values; and
a step of correcting multi-valued input tone levels of pixels based on the measurement values in a case where the controller obtains information indicating that a user has checked the warning.

* * * * *